(12) United States Patent
Nguyen et al.

(10) Patent No.: US 7,997,972 B2
(45) Date of Patent: Aug. 16, 2011

(54) METHOD AND SYSTEM FOR GAMING AND BRAND ASSOCIATION

(75) Inventors: Binh T. Nguyen, Reno, NV (US); Craig A. Paulsen, Reno, NV (US)

(73) Assignee: IGT, Reno, NV (US)

( * ) Notice: Subject to any disclaimer, the term of this patent is extended or adjusted under 35 U.S.C. 154(b) by 366 days.

(21) Appl. No.: 12/269,470

(22) Filed: Nov. 12, 2008

(65) Prior Publication Data

US 2009/0069078 A1  Mar. 12, 2009

Related U.S. Application Data

(60) Provisional application No. 10/946,719, filed on Sep. 21, 2004, now Pat. No. 7,455,586.

(51) Int. Cl.
*A63F 9/04* (2006.01)
*A63F 13/00* (2006.01)
*G06F 17/00* (2006.01)
*G06F 19/00* (2006.01)

(52) U.S. Cl. ............... 463/16; 463/25; 463/40; 463/42; 273/138.1; 273/139; 273/440; 705/16

(58) Field of Classification Search ............... None
See application file for complete search history.

(56) References Cited

U.S. PATENT DOCUMENTS

| | | | |
|---|---|---|---|
| 3,129,004 A | 4/1964 | Ritzler | |
| 3,468,476 A | 9/1969 | Keegan | |
| 4,592,546 A | 6/1986 | Fascenda et al. | |
| 4,815,741 A | 3/1989 | Small | |
| 4,854,590 A | 8/1989 | Jolliff et al. | |
| 4,869,500 A | 9/1989 | Williams | |
| 4,890,842 A | 1/1990 | Plange | |
| 4,982,346 A | 1/1991 | Girouard et al. | |
| 5,057,915 A | 10/1991 | Von Kohorn | |
| 5,076,613 A | 12/1991 | Kovacs | |
| 5,080,364 A | 1/1992 | Seidman | |
| 5,099,232 A | 3/1992 | Howes | |
| 5,137,278 A | 8/1992 | Schilling et al. | |
| 5,231,568 A | 7/1993 | Cohen et al. | |
| 5,269,522 A | 12/1993 | Chagoll et al. | |
| 5,362,051 A | 11/1994 | Swafford, Jr. et al. | |
| 5,373,440 A | 12/1994 | Cohen et al. | |
| 5,392,066 A | 2/1995 | Fisher et al. | |
| 5,551,692 A | 9/1996 | Pettit et al. | |

(Continued)

FOREIGN PATENT DOCUMENTS

JP 2002018140 1/2002

(Continued)

OTHER PUBLICATIONS

The Addams Family brochure, written by IGT, published in 2000.

(Continued)

*Primary Examiner* — Paul A. D'Agostino
(74) *Attorney, Agent, or Firm* — K&L Gates LLP

(57) ABSTRACT

A gaming system includes: (i) a base wagering game requiring a wager to made by a player; (ii) at least one winning outcome for the base wagering game; (iii) a paytable for the at least one winning outcome; a secondary award provided randomly to the player, the secondary party award provided by a secondary award provider and kept separate and apart from the paytable; and (iv) advertising for secondary award provider, the advertising provided in exchange for the provision of the secondary award.

18 Claims, 20 Drawing Sheets

U.S. PATENT DOCUMENTS

| | | |
|---|---|---|
| 5,555,991 A | 9/1996 | Hart |
| 5,620,182 A | 4/1997 | Rossides |
| 5,643,088 A | 7/1997 | Vaughn et al. |
| 5,695,402 A | 12/1997 | Stupak |
| 5,697,844 A | 12/1997 | Von Kohorn |
| 5,722,890 A | 3/1998 | Libby et al. |
| 5,791,991 A | 8/1998 | Small |
| 5,806,852 A | 9/1998 | Howes |
| 5,813,913 A | 9/1998 | Berner et al. |
| 5,816,918 A | 10/1998 | Kelly et al. |
| 5,851,147 A | 12/1998 | Stupak et al. |
| 5,857,175 A | 1/1999 | Day et al. |
| 5,883,620 A | 3/1999 | Hobbs et al. |
| 5,918,211 A | 6/1999 | Sloane |
| 5,928,082 A | 7/1999 | Clapper, Jr. |
| 5,933,811 A | 8/1999 | Angles et al. |
| 5,933,813 A | 8/1999 | Teicher et al. |
| 5,941,772 A | 8/1999 | Paige |
| 5,946,646 A | 8/1999 | Schena et al. |
| 5,946,664 A | 8/1999 | Ebisawa |
| 5,950,173 A | 9/1999 | Perkowski |
| 5,962,831 A | 10/1999 | Byrley |
| 5,979,757 A | 11/1999 | Tracy et al. |
| 5,991,736 A | 11/1999 | Ferguson et al. |
| 6,006,257 A | 12/1999 | Slezak |
| 6,007,426 A | 12/1999 | Kelly et al. |
| 6,009,410 A | 12/1999 | LeMole et al. |
| 6,009,412 A | 12/1999 | Storey |
| 6,015,344 A | 1/2000 | Kelly et al. |
| 6,024,642 A | 2/2000 | Stupak |
| 6,036,601 A | 3/2000 | Heckel |
| 6,039,648 A | 3/2000 | Guinn et al. |
| 6,048,268 A | 4/2000 | Humble |
| 6,102,799 A | 8/2000 | Stupak |
| 6,141,006 A | 10/2000 | Knowlton et al. |
| 6,165,070 A | 12/2000 | Nolte et al. |
| 6,173,267 B1 | 1/2001 | Cairns |
| 6,183,366 B1 | 2/2001 | Goldberg |
| 6,186,893 B1 | 2/2001 | Walker et al. |
| 6,196,920 B1 | 3/2001 | Spaur et al. |
| 6,213,874 B1 | 4/2001 | Heflin |
| 6,234,897 B1 | 5/2001 | Frohm et al. |
| 6,267,672 B1 | 7/2001 | Vance |
| 6,267,675 B1 | 7/2001 | Lee |
| 6,306,035 B1 * | 10/2001 | Kelly et al. ................... 463/25 |
| 6,322,309 B1 | 11/2001 | Thomas et al. |
| 6,324,519 B1 | 11/2001 | Eldering |
| 6,379,251 B1 | 4/2002 | Auxier et al. |
| 6,381,626 B1 | 4/2002 | DeLeo et al. |
| 6,390,917 B1 * | 5/2002 | Walker et al. .................. 463/20 |
| 6,443,843 B1 * | 9/2002 | Walker et al. .................. 463/42 |
| 6,447,395 B1 | 9/2002 | Stevens |
| 6,454,649 B1 | 9/2002 | Mattice et al. |
| 6,484,148 B1 | 11/2002 | Boyd |
| 6,523,824 B1 | 2/2003 | Colapinto et al. |
| 6,540,609 B1 | 4/2003 | Paige |
| 6,567,786 B1 | 5/2003 | Bibelnieks et al. |
| 6,567,842 B2 | 5/2003 | DeLeo et al. |
| 6,595,859 B2 | 7/2003 | Lynn |
| 6,606,745 B2 | 8/2003 | Maggio |
| 6,609,969 B1 | 8/2003 | Luciano et al. |
| 6,616,533 B1 | 9/2003 | Rashkovskiy |
| 6,625,578 B2 | 9/2003 | Spaur et al. |
| 6,633,850 B1 | 10/2003 | Gabbard et al. |
| 6,634,550 B1 | 10/2003 | Walker et al. |
| 6,645,068 B1 | 11/2003 | Kelly et al. |
| 6,656,050 B2 | 12/2003 | Busch et al. |
| 6,712,702 B2 | 3/2004 | Goldberg et al. |
| 6,729,884 B1 | 5/2004 | Kelton et al. |
| 6,749,504 B2 | 6/2004 | Hughs-Baird |
| 6,749,511 B2 | 6/2004 | Day |
| 6,764,395 B1 | 7/2004 | Guyett |
| 6,786,824 B2 | 9/2004 | Cannon |
| 6,790,142 B2 * | 9/2004 | Okada et al. .................. 463/42 |
| 6,834,856 B2 | 12/2004 | Wilson |
| 6,882,978 B2 | 4/2005 | Ebisawa |
| 6,885,995 B2 | 4/2005 | Bell et al. |
| 6,890,256 B2 | 5/2005 | Walker et al. |
| 6,899,626 B1 | 5/2005 | Luciano et al. |
| 6,907,400 B1 | 6/2005 | Matsko et al. |
| 6,912,504 B1 | 6/2005 | Rashkovskiy |
| 6,928,414 B1 | 8/2005 | Kim |
| 6,966,836 B1 | 11/2005 | Rush et al. |
| 7,025,674 B2 | 4/2006 | Adams et al. |
| 7,038,637 B1 | 5/2006 | Eller et al. |
| 7,052,392 B2 | 5/2006 | Tessmer et al. |
| 7,054,831 B2 | 5/2006 | Koenig |
| 7,056,208 B2 | 6/2006 | Cogert |
| 7,076,445 B1 | 7/2006 | Cartwright |
| 7,085,733 B2 | 8/2006 | Ebisawa |
| 7,094,149 B2 | 8/2006 | Walker et al. |
| 7,139,725 B1 | 11/2006 | Moyerson |
| 7,168,617 B2 | 1/2007 | Walker et al. |
| 2001/0041609 A1 | 11/2001 | Oranges et al. |
| 2002/0039923 A1 | 4/2002 | Cannon et al. |
| 2002/0077169 A1 | 6/2002 | Kelly et al. |
| 2002/0155877 A1 | 10/2002 | Enzminger et al. |
| 2002/0155891 A1 | 10/2002 | Okada et al. |
| 2003/0054881 A1 | 3/2003 | Hedrick et al. |
| 2003/0054888 A1 | 3/2003 | Walker et al. |
| 2003/0064788 A1 | 4/2003 | Walker et al. |
| 2003/0109306 A1 | 6/2003 | Karmarkar |
| 2003/0125103 A1 * | 7/2003 | Tessmer et al. ................. 463/20 |
| 2003/0141660 A1 * | 7/2003 | Colapinto et al. ........ 273/143 R |
| 2003/0148812 A1 | 8/2003 | Paulsen et al. |
| 2003/0186745 A1 | 10/2003 | Nguyen et al. |
| 2003/0195024 A1 | 10/2003 | Slattery |
| 2004/0002385 A1 | 1/2004 | Nguyen |
| 2004/0077397 A1 | 4/2004 | Hosaka |
| 2004/0106449 A1 | 6/2004 | Walker et al. |
| 2004/0116183 A1 | 6/2004 | Prindle |
| 2004/0152518 A1 | 8/2004 | Kogo |
| 2004/0198485 A1 | 10/2004 | Loose et al. |
| 2005/0059494 A1 | 3/2005 | Kammler |
| 2006/0009284 A1 | 1/2006 | Schwartz et al. |
| 2006/0059046 A1 | 3/2006 | Mohr et al. |
| 2006/0063587 A1 | 3/2006 | Manzo |
| 2006/0194631 A1 | 8/2006 | Rowe et al. |
| 2006/0247037 A1 | 11/2006 | Park |

FOREIGN PATENT DOCUMENTS

| | | |
|---|---|---|
| JP | 2002040975 | 2/2002 |
| JP | 2002099819 | 4/2002 |
| JP | 2002273060 | 9/2002 |
| JP | 2003199971 | 7/2003 |
| JP | 2003330397 | 11/2003 |
| JP | 2004188096 | 7/2004 |
| JP | 2005323789 | 11/2005 |
| WO | WO0075824 | 12/2000 |
| WO | WO0169512 | 9/2001 |
| WO | WO0176709 | 10/2001 |
| WO | WO0180962 | 11/2001 |
| WO | WO03044709 | 5/2003 |
| WO | WO2005006238 | 1/2004 |
| WO | WO2004111893 | 12/2004 |
| WO | WO2006031766 | 3/2006 |

OTHER PUBLICATIONS

Tabasco® Slots brochure, written by IGT, published in 2001.
Alien brochure, written by IGT, published in 2003.
PCT International Preliminary Report on Patentability for International Application No. PCT/US2005/031215 dated Mar. 27, 2007.
English Abstract of Korean Publication No. KR20010011724 dated Feb. 15, 2001.
English Abstract of Korean Publication No. KR20010017998 dated Mar. 5, 2001.
English Abstract of Korean Publication No. KR20010035469 dated May 7, 2001.
English Abstract of Korean Publication No. KR20010060871 dated Jul. 7, 2001.
English Abstract of Korean Publication No. KR20010084633 dated Sep. 6, 2001.
English Abstract of Korean Publication No. KR20010084838 dated Sep. 6, 2001.

English Abstract of Korean Publication No. KR20010088131 dated Sep. 26, 2001.
English Abstract of Korean Publication No. KR20010091477 dated Oct. 23, 2001.
English Abstract of Korean Publication No. KR20010092943 dated Oct. 27, 2001.
English Abstract of Korean Publication No. KR20020013332 dated Feb. 20, 2002.
English Abstract of Korean Publication No. KR20020035684 dated May 15, 2002.
English Abstract of Korean Publication No. KR20020038869 dated May 24, 2002.
English Abstract of Korean Publication No. KR20040020684 dated Mar. 9, 2004.

* cited by examiner

METHOD AND SYSTEM FOR GAMING AND BRAND ASSOCIATION

PRIORITY CLAIM

This application is a continuation of and claims the benefit of and priority to U.S. patent application Ser. No. 10/946,719, filed Sep. 21, 2004, the entire contents of which are incorporated herein.

BACKGROUND

This patent is directed to methods and systems for gaming, and in particular to methods and systems for gaming and brand association.

SUMMARY

In one aspect, a gaming method includes receiving a first wager from a player, displaying a first image representing a game, determining a first outcome associated with the game, and determining a first payout according to the first outcome and a first paytable. The gaming method also includes determining if a brand-association event has occurred, selecting a brand if the brand-association event has occurred, using a second paytable if the brand-association event has occurred, the second paytable including at least one payout associated with the selected brand, receiving a second wager from the player, displaying a second image representing a game, determining a second outcome associated with the game, and determining a second payout according to the second outcome and the second paytable, the second payout comprising the at least one payout associated with the selected brand.

In another aspect, a gaming method includes selecting a brand, displaying an image representative of an advertisement for at least one of a good and a service provided by a brand-promoter associated with the selected brand, displaying an image representative of a game, the image comprising at least one game element incorporating brand information according to the selected brand, determining an outcome of the game, and determining a payout according to the outcome, the payout comprising at least one good or service associated with the selected brand.

Additional features and advantages are described herein, and will be apparent from, the following Detailed Description and the figures.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
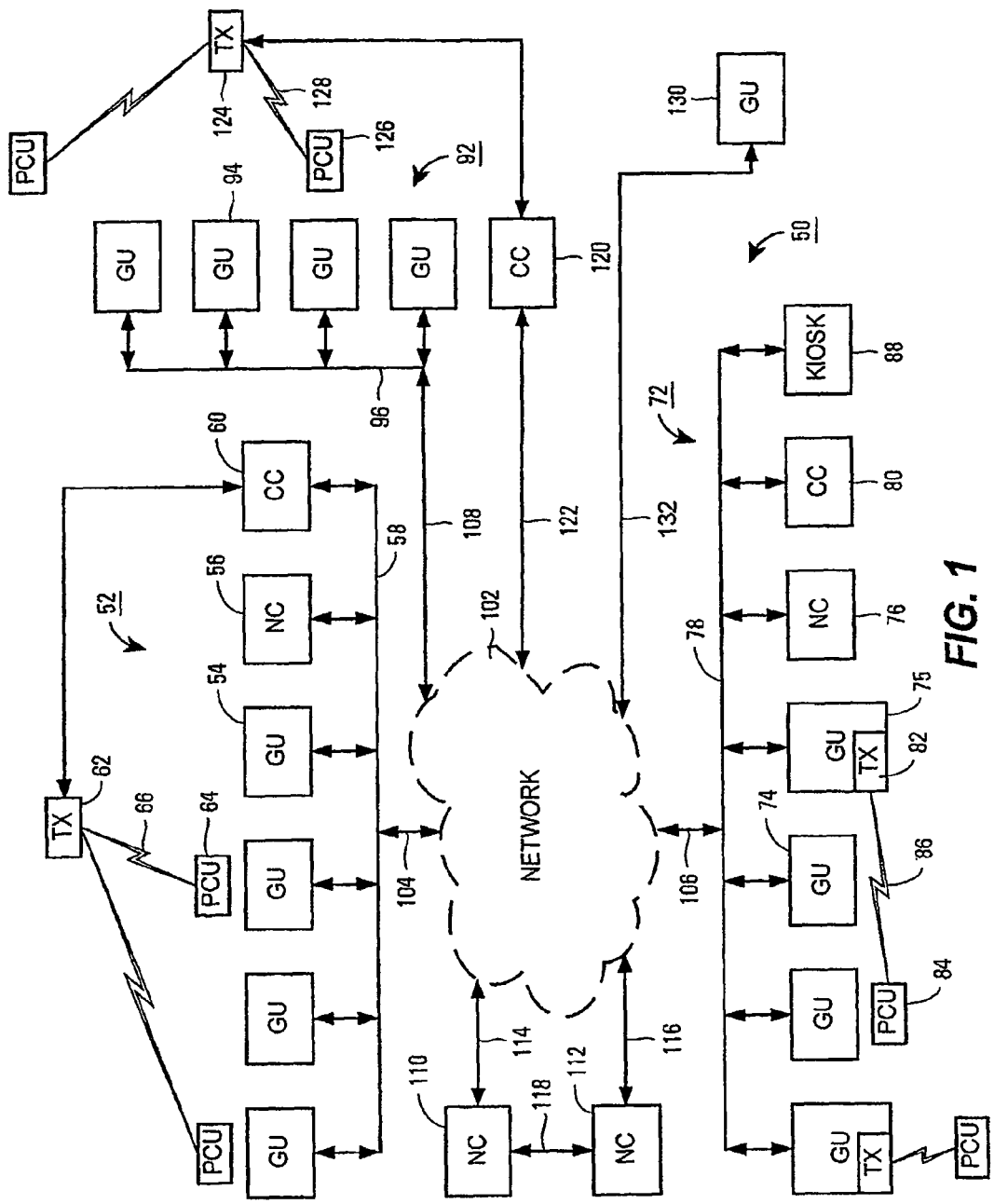
FIG. 1 is a block diagram of an embodiment of a gaming and brand association system in accordance with the invention.

FIG. 1 illustrates one possible embodiment of a casino gaming and brand association system 50 (hereinafter "system 50") in accordance with the disclosure. Referring to FIG. 1, the system 50 may include a first group or network 52 of casino gaming units 54 operatively coupled to a network computer 56 via a network data link or a bus 58. The first network 52 may also include a communications computer 60, which may be coupled to the network computer 56 via the data link or bus 58. The communications computer 60 may also be coupled to a transceiver 62, which transceiver may be a wireless transceiver, such as a radio frequency transceiver or infrared transceiver, for example. The transceiver 62 may be in communication with one or more personal communication units 64 (such as a Personal Digital Assistant or the like, having a controller including a processor and memory operatively coupled to the processor), a data link 66 being formed according to the method of communication used (e.g., radio frequency, infrared, etc.). The personal communication units 64 may be owned by the player, or may be provided to the player by the operator of the network 52.

The system 50 may include a second group or network 72 of casino gaming units 74, 75 operatively coupled to a network computer 76 via a network data link or a bus 78. The second network 72 may also include a communications computer 80, which may be coupled to the network computer 76 via the data link or bus 78. The communications computer 80 may also be coupled via the data link or bus 78 to transceivers 82 that are attached to or integrated with the gaming units 75, which transceivers may be wireless transceivers, such as a radio frequency transceivers or infrared transceivers, for example. The transceivers 82 may be in communication with one or more personal communication units 84, a data link 86 being formed according to the method of communication used (e.g., radio frequency, infrared, etc.). The personal communication units 84 may be owned by the player, or may be provided to the player by the operator of the network 72. The network 72 may also include a kiosk 88, which differs from the gaming units 74, 75 in that the kiosk is not programmed to operate according to the gaming aspect of the system 50, the gaming aspect being explained in greater detail with reference to FIGS. 9-21.

The system 50 may further include a third group or network 92 of casino gaming units 94. The gaming units 94 may be coupled via a data link or a bus 96. The third network 92 differs from the first and second networks in that there is no network computer coupled to the data link 96.

The first, second, and third gaming networks 52, 72, 92 may be operatively coupled to each other via a fourth network 102, which may comprise, for example, the Internet, an intranet, a wide area network (WAN), or a local area network (LAN). The network 102 may include a plurality of network computers or server computers (not shown), each of which may be operatively interconnected, and may include Internet Service Providers (ISPs) or online service providers. The first, second and third networks 52, 72, 92 may be coupled to the fourth network 102 via a first, second, and third data links 104, 106, 108. Where the network 102 comprises an Intranet or the Internet, data communication may take place over the communication links 104, 106, 108 via an Internet communication protocol.

The fourth network 102 may also be coupled to other computers or networks other than the first, second and third networks 52, 72, 92 discussed above. For example, the fourth network 12 may be coupled to one or more other network computers 110, 112, via data links 114, 116. These network computers may, in turn, be coupled via data links 118. Additionally, the fourth network 102 may be coupled to a communications computer 120 via a data link 122, the communications computer 120 being coupled to a transceiver 124. The transceiver 124 is shown in communication with personal communication units 126, which may be in the same geographic location as the gaming units 94 of the network 92, via a data link 128 formed according to the method of communication used (e.g. radio frequency, infrared, etc.). The personal communication units 126 may be owned by the player, or may be provided to the player by the operator of the network 92. Also shown coupled to the network 102 is a gaming unit 130; the network 102 may be coupled to the gaming unit 130 by a data link 132.

The network computer 56 may be a server. According to one embodiment, the network computer 56 may be used as an accounting system server to accumulate and analyze data relating to the operation of the gaming units 54. For example, the network computer 56 may continuously receive data from each of the gaming units 54 indicative of the dollar amount and number of wagers being made on each of the gaming units 54, data indicative of how much each of the gaming units 54 is paying out in winnings, etc. According to another embodiment, the network computer 56 may be used as a player tracking server or a bonusing server to accumulate and analyze data relating to the operation of particular gaming units 54. According to this embodiment, the network computer 56 may receive data from a particular gaming unit 54 indicative of the identity of the player operating the gaming unit 54, the number of wagers being made on the gaming unit 54, etc. If the network computer 56 is being used as a player tracking server, the network computer 56 may use the data accumulated to award player tracking points to the player, which points may be used to assess comps or to be redeemed for goods or services. If the network computer is being used as a bonusing computer, the network computer 56 may use the data accumulated to award the player prizes, which may be goods or services, based on individual or collective performance, to award bonusing points which points may be redeemed for goods or services, etc. According to a still further embodiment, the network computer 56 may be used as a download server to monitor the software implemented by and the data utilized by the gaming units 54, to determine if software or data upgrades are available, and to download the upgrades to the gaming units 54. According to yet another embodiment, the network computer 56 may be used as a brand association server, as will be explained in greater detail with reference to FIG. 1A, below.

The network computer 76 may be a server and may be used to perform the same or different functions in relation to the gaming units 74, 75 as the network computer 56 described above. Similarly, the network computers 110, 112 may be servers, and may be used to perform the same or different functions in relation to the gaming units 54, 74, 75, 94 as the network computers 56, 76. Moreover, the network computers 110, 112 may be different servers, and may perform the same or different functions in relation to the gaming units 54, 74, 75, 94.

As an alternative, the operation of the gaming units may be monitored and/or coordinated without the use of a central computer or controller, as in the third network 92. During operation, the processing required by the operations otherwise performed by a network computer may be shared by the gaming units 94. Such shared processing may be referred to as peer-to-peer networking, and is also within the scope of the present disclosure.

The communications computers 60, 80 may also be servers. That is, the computers 60, 80 may monitor and coordinate the communications between other computers, such as the network computers 56, 76, and the personal communication devices 64, 84 via the transceivers 62, 82. Alternatively, as in the case of the communications computer 120, the communications computer may be part of a mobile communications network that is operated and administered by an entity other than the entity that operates and administers the network of gaming units, such as gaming units 94. Such a mobile communications network may be a cellular telephone network, and the communications computer 120 may represent the base station system of such a network, which base station system may be in communication with the Internet via a gateway, for example. According to this embodiment, the personal communication units 126 may be mobile stations, such as cellular telephones, portable e-mail devices (e.g., BLACKBERRY® devices manufactured by Research In Motion Ltd., of Waterloo, Ontario, Canada), personal digital assistants (PDA), laptops, tablet personal computers, etc.

The first network 52 of gaming units 54 may be provided in a first casino, the second network 72 of gaming units 74, 75 may be provided in a second casino located in a separate geographic location than the first casino, and the third network 92 of gaming units 94 may be provided in a third casino in a separate geographic location that the first and the second networks. For example, the three casinos maybe located in different areas of the same city, or they may be located in different states. However, the three networks 52, 72, 92 may be disposed in different sections of the same casino, or the gaming units 54, 74, 75, and 94 may even be disposed in the same section of the same casino.

Although the networks 52, 72 are shown as including one network computer 56, 76, one communications computer 60, 80, and four gaming units 54, 74, 75 and the network 92 as including four gaming units 94, it should be understood that different numbers of computers and gaming units may be utilized. For example, the network 52 may include a plurality of network computers 56 and tens or hundreds of gaming units 54, all of which may be interconnected via the data link 58. The data link 58 may be provided as a dedicated hardwired link, a wireless link, a fiber optic link, or a network (LAN, WAN, Internet, intranet) connection. Although the data link 58 is shown as a single data link 58, the data link 58 may comprise multiple data links. Numerous gaming units 130, kiosks 88 and personal communication units 64, 84, 126 may also be included.

Figure 1A:
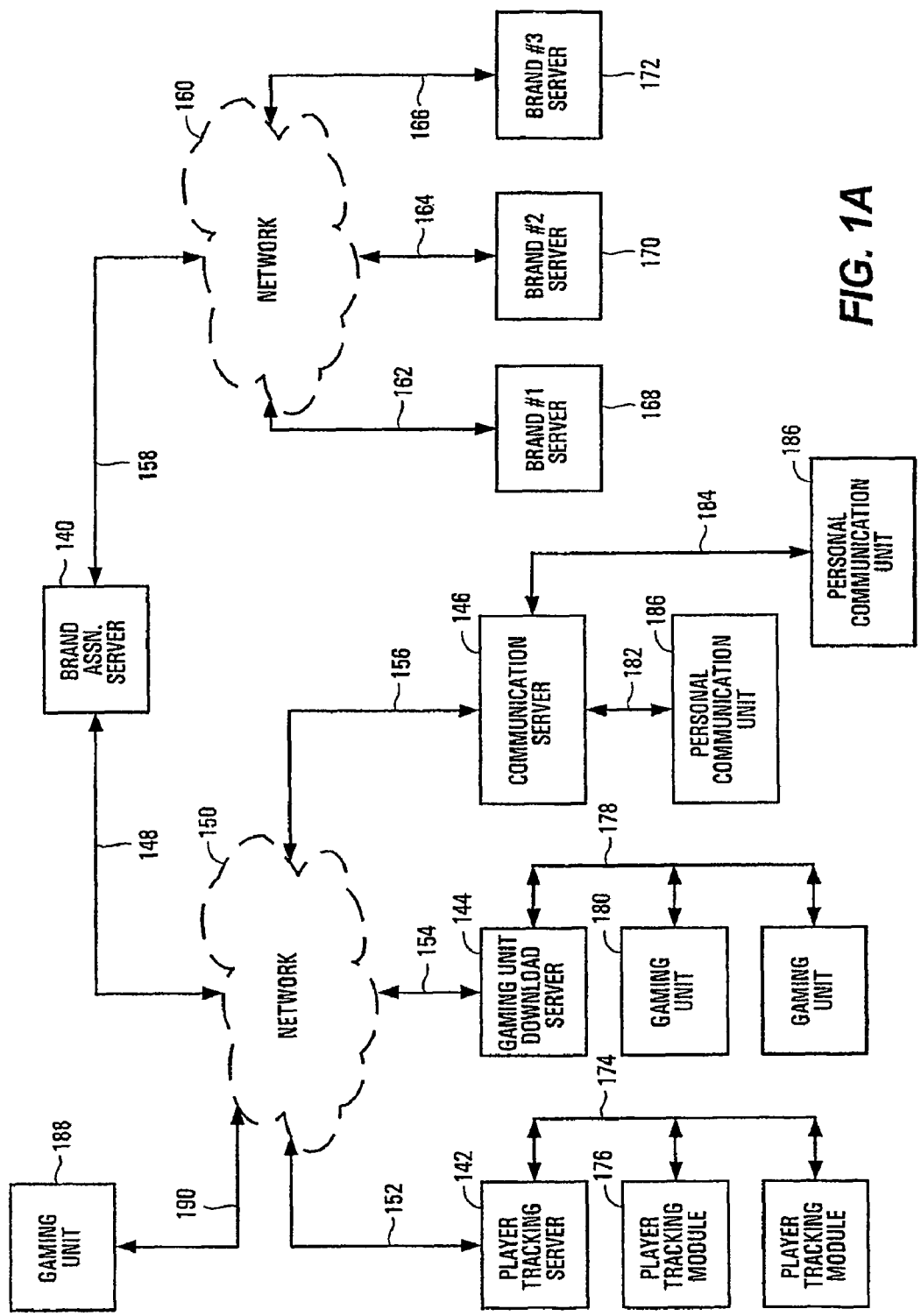
FIG. 1A is a block diagram of a brand association aspect of the gaming system shown in FIG. 1.

FIG. 1A is one embodiment of the system 50, as seen from the point of view of the brand association aspect of the system 50. As such, many of the elements of the system 50 referenced in FIG. 1A correspond to one or more of the elements described with reference to FIG. 1. However, as more than one of the elements described in FIG. 1 may correspond to the elements shown in FIG. 1A, the elements of FIG. 1A have been numbered separately, and the correspondences addressed in turn in detail below.

As seen in FIG. 1A, the system 50 may include several servers 140, 142, 144, 146, although other servers may be included. These servers 140, 142, 144, 146 may correspond to one or more of the network computers 56, 76, 110, 112 or the communications computers 60, 80, or, alternatively, the processing of these servers may be shared by gaming units, as in the network 92. The servers shown are as follows: a brand association server 140, a player tracking server 142, a gaming unit download server 144, and a communication server 146. Other servers that may be used with the system 50 could include advertisement scheduling servers, advertisement selection servers, advertising billing servers (which may include both local advertisement billing servers and national advertisement billing servers) etc.; many of the operations carried out by such servers are discussed below in regard to the brand association server 140, but it should be understood that these operations could be tasked to one or more of the servers just mentioned.

The servers 140, 142, 144, 146 may be connected by one or more data links and one or more networks. According to the embodiment shown, the brand association server 140 is coupled via a data link 148 and a network 150 to the player tracking server 142, the gaming unit download server 144, and the communication server 146 via the data links 152, 154, 156. The brand association server 140 is also coupled via a data link 158 another network 160, which is in turn coupled via a data links 162, 164, 166 to remote servers 168, 170, 172. The servers 168, 170, 172 may be associated with three different brands, for example, as will be explained in greater detail below.

Additionally, certain of the servers may be coupled to other elements, such as player tracking modules, gaming units, and personal communication units. For example, the player tracking server 142 (which may be one of the network computers 56, 76, 110, 112) is coupled, via data link 174, to player tracking modules 176. These player tracking modules 176 may be associated with the gaming units 54, 74, 75, 94, and are discussed in greater detail below. Similarly, the gaming unit download server 144 (which may be one of the network computers 56, 76, 110, 112) is coupled, via data link 178, to gaming units 180, which may be the gaming units 54, 74, 75, 94. Further, the communications server 146 (which may be one of the communications computers 60, 80) may be in communication with, via data links 182, 184, personal communication units 186, which may be the personal communication units 64, 84. A gaming unit 188 may also be coupled to the network 150 separate and apart from the servers 142, 144, 146 via a data link 190.

Figure 2:
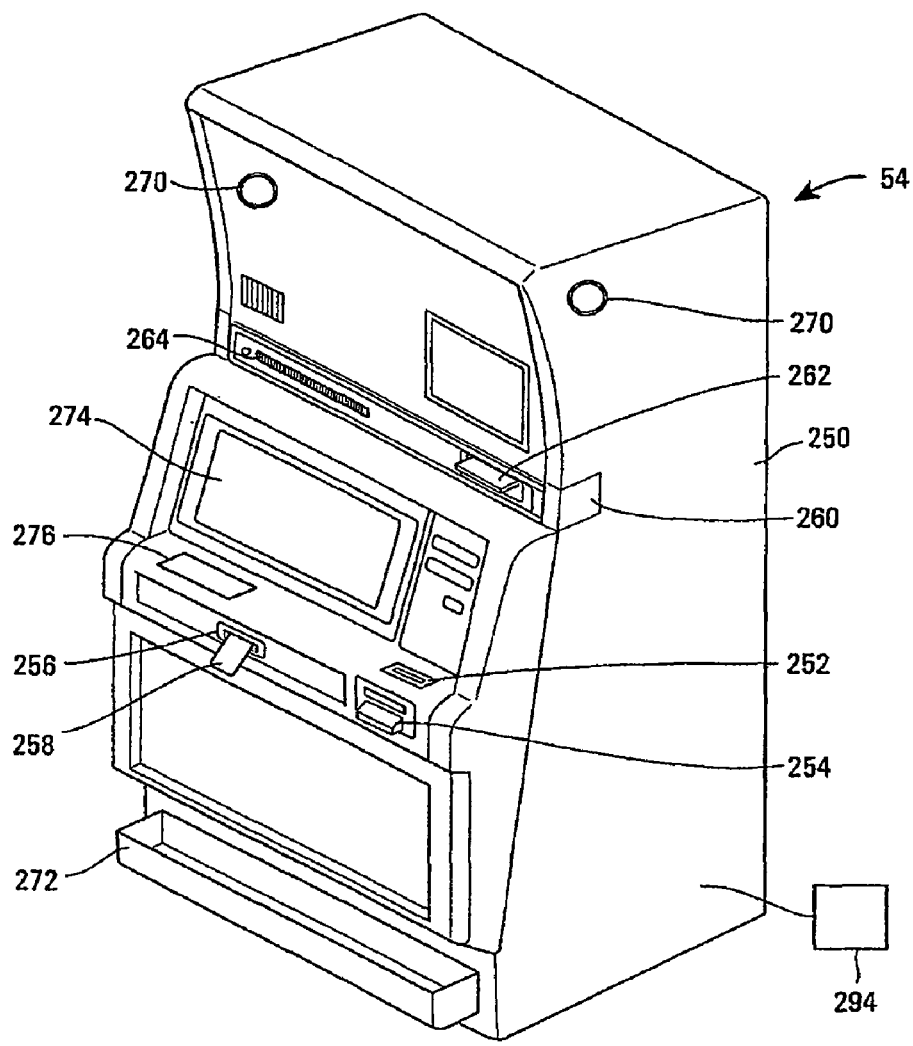
FIG. 2 is a perspective view of an embodiment of one of the gaming units shown schematically in FIG. 1.

FIG. 2 is a perspective view of one possible embodiment of one or more of the gaming units 54. Although the following description addresses the design of the gaming units 54, it should be understood that the gaming units 74, 75, 94 may have the same design as the gaming units 54 described below. It should be understood that the design of one or more of the gaming units 54 may be different than the design of other gaming units 54, and that the design of one or more of the gaming units 74, 75, 94 may be different than the design of other gaming units 74, 75, 94. Each gaming unit 54 may be any type of casino gaming unit and may have various different structures and methods of operation. For exemplary purposes, various designs of the gaming units 54 (and 75) are described below, but it should be understood that numerous other designs may be utilized.

Referring to FIG. 2, the casino gaming unit 54 may include a housing or cabinet 250 and one or more value input devices, which may include a coin slot or acceptor 252, a paper currency acceptor 254, and a ticket reader/printer 256. The value input device may also be a card reader (not shown). A value input device may include any device that can accept value from or transfer value for a player, and may be disposed on the front of the gaming unit 54 or in any other suitable location. As used herein, the term "value" may encompass money denominations or credits, and may be in the form of coins, paper currency, gaming tokens, ticket vouchers, credit or debit cards, smart cards, electronic funds transfers (EFT) and any other object representative of value.

Some of the value input devices may also operate as value output devices. For example, if provided on the gaming unit 54, the ticket reader/printer 256 may be used to print or otherwise encode ticket vouchers 258. The ticket vouchers 258 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 258 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 258 could be printed with an optically readable material such as ink, or data on the ticket vouchers 258 could be magnetically encoded. The ticket reader/printer 256 may be provided with the ability to both read and print ticket vouchers 258, or it may be provided with the ability to only read or only print or encode ticket vouchers 258. In the latter case, for example, some of the gaming units 54 may have ticket printers 256 that may be used to print ticket vouchers 258, which could then be used by a player in other gaming units 54 that have ticket readers 256.

As another alternative, an electronic funds transfer (EFT) device (not shown) may operate as both a value input device and a value output device. Such an EFT device may include a circuit capable of performing or a controller programmed to perform an electronic funds transfer (EFT) to the player's bank account or to a virtual account established, for example, on a PDA or a smart card (e.g., a card with an on-board processor and memory) or at a casino. Such a transfer may be performed over a hardwired, wireless, fiber optic or network connection. As such a device is capable of transferring money to and from the gaming unit 54, it may operate either as a value input device or a value output device.

Also attached to the gaming unit 54 is a player tracking module 260, which may be the player tracking module 176 referred to in FIG. 1A. The player tracking module 260 includes a card reader 262 and a display 264. The card reader 262 may include any type of card reading device, such as a magnetic card reader or an optical card reader, and may be used to read data from a card offered by a player, such as a player tracking card. The card reader 262 may be used to read data from, and/or write data to, player tracking cards that are capable of storing data representing the identity of a player, the identity of a casino, the player's gaming habits, etc. The display 264 may be a liquid crystal display (LCD), a vacuum fluorescent display (VFD), an array of light emitting diode (LED) elements, etc. The display 264 may be used to display messages particular to the player tracking system, or may be controlled by the gaming unit 54 or other servers to display messages particular to the operation of the gaming unit 54 or other systems (such as, for example, bonusing messages from a bonusing system).

The gaming unit 54 may include one or more audio speakers 270, a coin payout tray 272, a display unit 274, and an input control panel 276. The audio speakers 270 may generate audio representing sounds or sound effects such as the noise of spinning slot machine reels, a dealer's voice, music, announcements or any other audio related to a casino game. Where the gaming unit 54 is designed to facilitate play of a video casino game, such as video poker or video slots, the display unit 274 may be a color video display unit that displays images relating to the particular game or games. Where the gaming unit 54 is designed to facilitate play of a reel-type slot machine, the display unit 274 may comprise a plurality of mechanical reels that are rotatable, with each of the reels having a plurality of reel images disposed thereon. The input control panel 276 may be provided with a plurality of pushbuttons or touch-sensitive-areas that may be pressed by a player to select games, make wagers, make gaming decisions, etc.

Figure 2A:
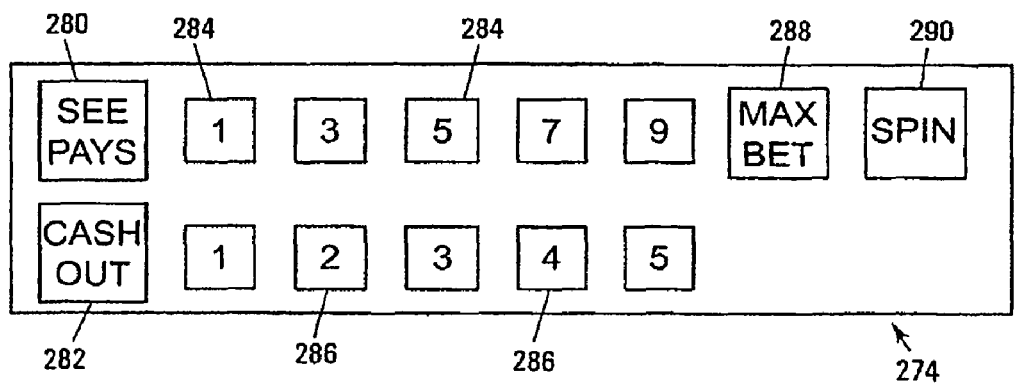
FIG. 2A illustrates an embodiment of a control panel for a gaming unit.

FIG. 2A illustrates one possible embodiment of the control panel 276, which may be used where the gaming unit 54 is a slot machine having a plurality of mechanical reels or representations of reels displayed on an electrical display unit 274. Referring to FIG. 2A, if the display unit 274 is provided in the form of a video display unit, the control panel 276 may include a "See Pays" button 280 that, when activated, causes the display unit 274 to generate one or more display screens showing the odds or payout information for the game or games provided by the gaming unit 54. As used herein, the term "button" is intended to encompass any device that allows a player to make an input, such as an input device that must be depressed to make an input selection or a display area that a player may simply touch. The control panel 276 may include a "Cash Out" button 282 that may be activated when a player decides to terminate play on the gaming unit 54, in which case the gaming unit 54 may return value to the player, such as by returning a number of coins to the player via the payout tray 272.

If the gaming unit 54 provides a slots game having a plurality of reels and a plurality of paylines which define winning combinations of reel symbols, the control panel 276 may be provided with a plurality of selection buttons 284, each of which allows the player to select a different number of paylines prior to spinning the reels. For example, five buttons 284 may be provided, each of which may allow a player to select one, three, five, seven or nine paylines.

If the gaming unit 54 provides a slots game having a plurality of reels, the control panel 276 may be provided with a plurality of selection buttons 286 each of which allows a player to specify a wager amount for each payline selected. For example, if the smallest wager accepted by the gaming unit 54 is a quarter ($0.25), the gaming unit 54 may be provided with five selection buttons 286, each of which may allow a player to select one, two, three, four or five quarters to wager for each payline selected. In that case, if a player were to activate the "5" button 284 (meaning that five paylines were to be played on the next spin of the reels) and then activate the "3" button 286 (meaning that three coins per payline were to be wagered), the total wager would be $3.75 (assuming the minimum bet was $0.25).

The control panel 276 may include a "Max Bet" button 288 to allow a player to make the maximum wager allowable for a game. In the above example, where up to nine paylines were provided and up to five quarters could be wagered for each payline selected, the maximum wager would be 45 quarters, or $11.25. The control panel 276 may include a spin button 290 to allow the player to initiate spinning of the reels of a slots game after a wager has been made.

In FIG. 2A, a rectangle is shown around the buttons 280, 282, 284, 286, 288, 290. It should be understood that that rectangle simply designates, for ease of reference, an area in which the buttons 280, 282, 284, 286, 288, 290 may be located. Consequently, the term "control panel" should not be construed to imply that a panel or plate separate from the housing 250 of the gaming unit 54 is required, and the term "control panel" may encompass a plurality or grouping of player activatable buttons.

Although one possible control panel 276 is described above, it should be understood that different buttons could be utilized in the control panel 276, and that the particular buttons used may depend on the game or games that could be played on the gaming unit 54. If the display unit 274 is provided as a video display unit, the control panel 276 could be generated by the display unit 274. In that case, each of the buttons of the control panel 276 could be a colored area generated by the display unit 274, and some type of mechanism may be associated with the display unit 274 to detect when each of the buttons was touched, such as a touch-sensitive screen.

The gaming unit 54 may also include a mechanism 294 by which the gaming unit 54 may determine the identity of the player. This mechanism may be separate from the other elements of the gaming unit 54, may be incorporated into one of the other elements of the gaming unit 54, or its function may be provided by one of the other elements of the gaming unit 54. As an example of the latter category, the card reader 262 may be used to read a card that carries an identification code that may be uniquely associated with the player so that the gaming unit 54 can differentiate that player from all other players, or so that the gaming unit 54 can differentiate that player as a member of a group of players from all players not a member of the group of players. In FIG. 2, a separate identification device 294 is illustrated.

The identification device 294 may include equipment, such as a keypad, an input pad (with optional stylus), a port (or antenna) adapted to communicate via a wired or wireless link (infrared or radio frequency link, for example) to a Personal Digital Assistant (PDA), a camera, a scanner, a retinal (or iris) scanner, fingerprint scanner, and/or a microphone. The identification device 294 may include any one of these devices, or the identification device 294 may include a combination of some or all of these devices. Thus, utilizing the identification device 294, a player may identify him or herself by entering a unique numeric or alpha-numeric code using the key pad, for example. Alternatively, the player may use his or her finger or the stylus to sign his or her signature on the input pad. The pad and/or stylus may include instrumentation to record such characteristics as position, form, speed, and/or pressure as the player signs his or her signature. As a further alternative, the player may sign his or her signature on the Personal Digital Assistant, which signature is then converted to electronic data, and the data is then transferred via the port/antenna to the identification device 294. As yet another alternative, the player may sign his or her signature on a piece of paper that is then photographed using the camera or scanned using the scanner (or the bill acceptor 254) to convert the signature into electronic data. As an additional alternative, the player may place one of his or her fingers or his or her hand on the scanner, and the scanner may generate an electronic data representation of the fingerprint on one or more of the player's fingers or an electronic data representation of the pattern of the entire hand. Alternatively, the camera may be used to take a picture (live or still) of the player, the picture then being converted into electronic data. As a still further alternative, the player may place his or her eye up to the retinal (or iris) scanner, and the retinal (or iris) scanner may generate an electronic data representation corresponding to the pattern of the retina (or iris) of the player. As yet another alternative, the player may speak into the microphone, and characteristics of the spoken words (or voiceprint) may be converted into an electronic data representation.

Other equipment may also be used in conjunction with the identification device 294. For example, rather than using a stylus, a mouse or glove may be used. Additionally, thermal imaging equipment may be included or substituted. Moreover, a touchscreen may be integrated with the display unit 274 and used, in place of the input pad, in combination with a stylus or a finger, for example.

Gaming Unit Electronics

Figure 3:
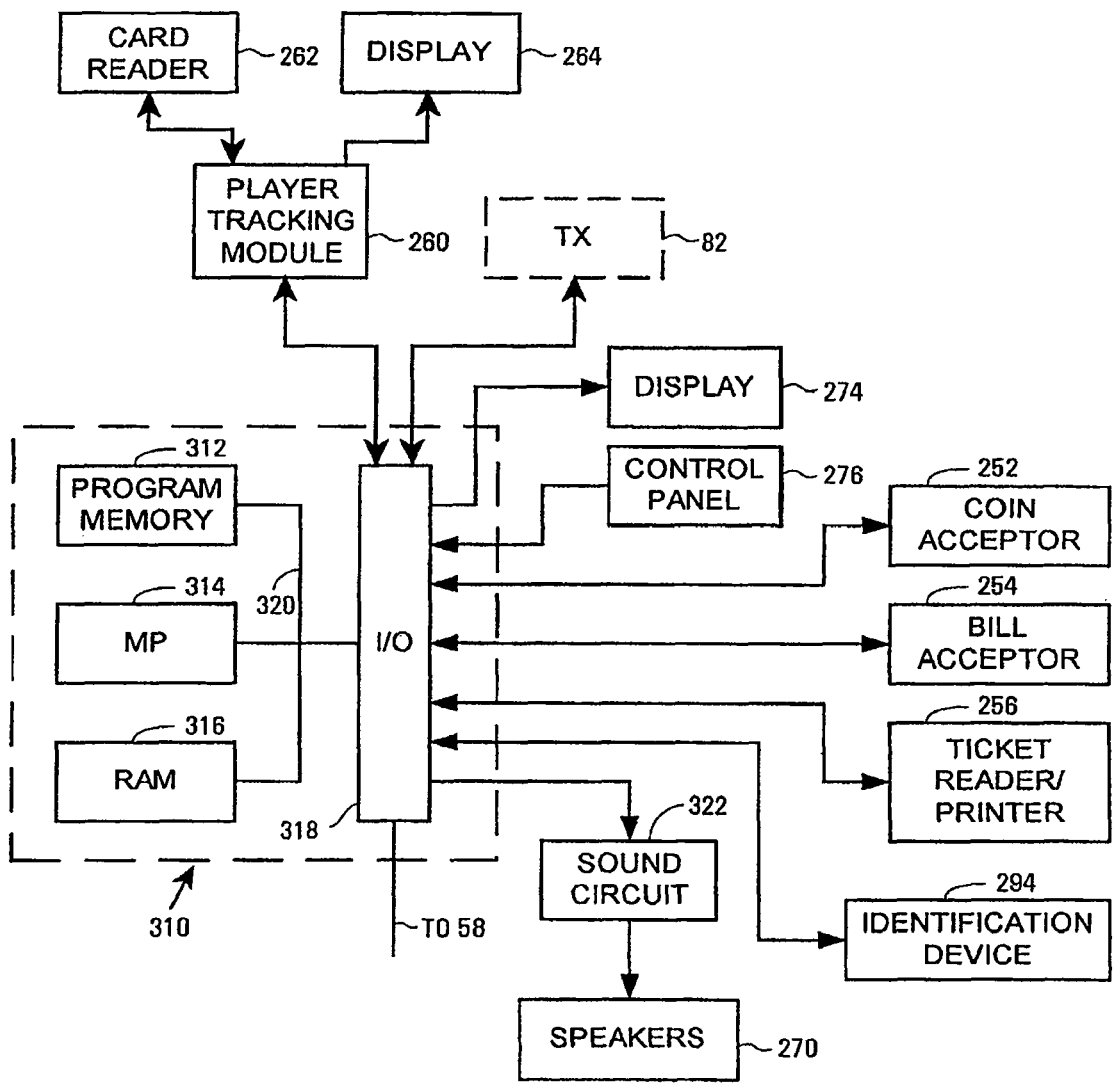
FIG. 3 is a block diagram of the electronic components of the gaming unit of FIG. 2.

FIG. 3 is a block diagram of a number of components that may be incorporated in the gaming unit 54. Referring to FIG. 3, the gaming unit 54 may include a controller 310 that may comprise a program memory 312, a microcontroller or microprocessor (MP) 314, a random-access memory (RAM) 316 and an input/output (I/O) circuit 318, all of which may be interconnected via an address/data bus 320. It should be appreciated that although only one microprocessor 314 is shown, the controller 310 may include multiple microprocessors 314. Similarly, the memory of the controller 310 may include multiple RAMs 316 and multiple program memories 312. Although the I/O circuit 318 is shown as a single block, it should be appreciated that the I/O circuit 318 may include a number of different types of I/O circuits. The RAM(s) 316 and program memories 312 may be implemented as semiconductor memories, magnetically readable memories, and/or optically readable memories, for example.

Although the program memory 312 is shown in FIG. 3 as a read-only memory (ROM) 312, the program memory of the controller 310 may be a read/write or alterable memory, such as a hard disk. In the event a hard disk is used as a program memory, the address/data bus 320 shown schematically in FIG. 3 may comprise multiple address/data buses, which may be of different types, and there may be an I/O circuit disposed between the address/data buses.

Furthermore, while the controller 310 is shown as a dashed box surrounding the memories 312, 316, processor 314, and I/O circuit 318, this should not be interpreted as a physical limitation on the controller 310. The memories 312, 316 and processor 314 may be disposed on a single board, or they may be disposed on separate boards. Similarly, the I/O circuit 318 may be disposed on the same board as the memories 312, 316 and processor 314, or may be disposed on a separate board.

FIG. 3 illustrates that the coin acceptor 252, the bill acceptor 254, the ticket reader/printer 256, the player tracking module 260, the display unit 274, the control panel 276, and the identification device 294 may be operatively coupled to the I/O circuit 318, each of those components being so coupled by either a unidirectional or bidirectional, single-line or multiple-line data link, which may depend on the design of the component that is used. The speaker(s) 270 may be operatively coupled to a sound circuit 322, that may comprise a voice- and sound-synthesis circuit or that may comprise a driver circuit. The sound generating circuit 322 may be coupled to the I/O circuit 318. Additionally, for a gaming unit such as the gaming unit 75, the transceiver 82 may also be coupled to the I/O circuit 318.

As shown in FIG. 3, the components 252, 254, 256, 260, 274, 276, 294, 322 (and, optionally, 82) may be connected to the I/O circuit 318 via a respective direct line or conductor. Different connection schemes could be used. For example, one or more of the components shown in FIG. 3 may be connected to the I/O circuit 318 via a common bus or other data link that is shared by a number of components. Furthermore, some of the components may be directly connected to the microprocessor 314 without passing through the I/O circuit 318.

Figure 3A:
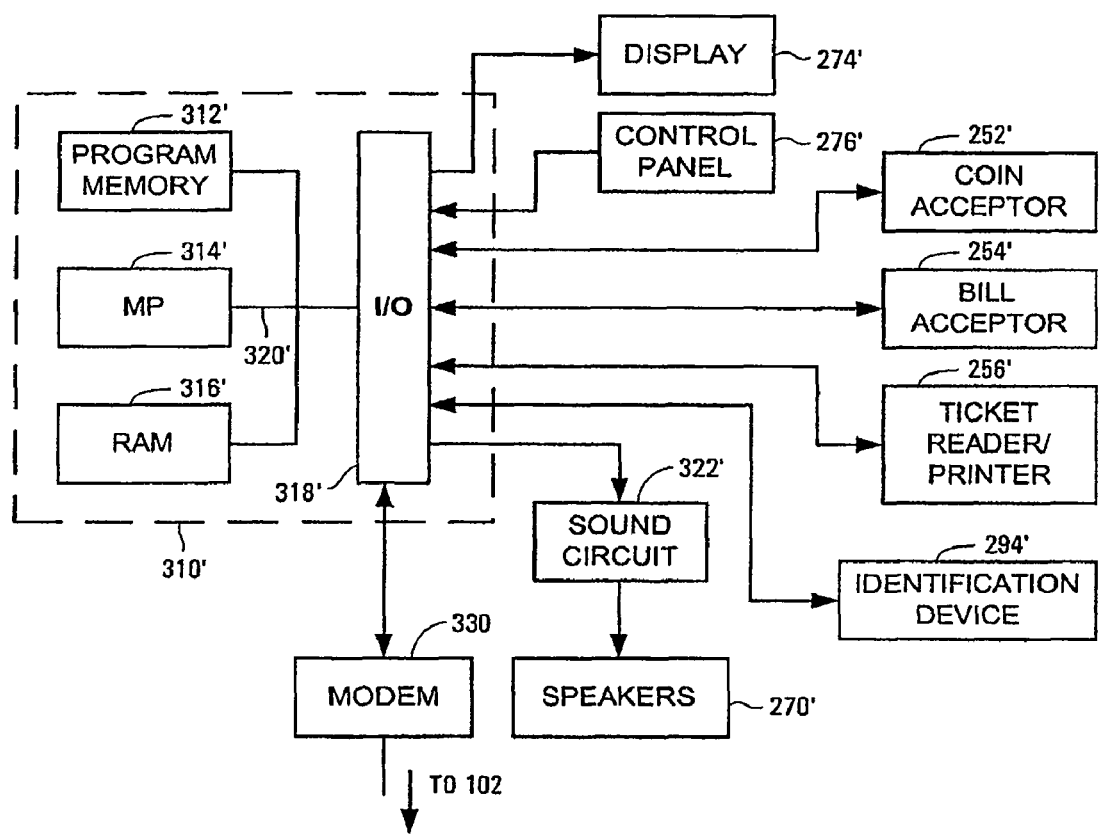
FIG. 3A is a block diagram of the electronic components of an alternative gaming unit.

FIG. 3A is a block diagram of a number of components that may be incorporated in an alternative gaming unit, such as the gaming unit 130 shown in FIG. 1 or the gaming unit 188 shown in FIG. 1A (which may represent the same gaming unit). Elements similar to those in FIG. 3 are numbered similarly, with the distinction that the similar elements shown in FIG. 3A are denoted with a prime.

Similar to the gaming unit 54 shown in FIG. 3, the gaming unit 130 shown in FIG. 3A may include a controller 310' having program memory 312', microprocessor 314', and RAM 316'. Moreover, the program memory 312', microprocessor 314' and RAM 316' may be operatively coupled to an input/output circuit 318' via a data link or a bus 320'. Further, the I/O circuit 318' may be coupled to a display 274' and a control panel 276', and to speakers 270' via a sound circuit 322'. While the I/O circuit 318' is shown coupled to wager input devices, such as a coin acceptor 252', a currency acceptor 254' and a ticket reader/printer 256', these elements may be optional according to an embodiment of the gaming unit 130 that envisions implementation of cashless gaming. An identification device 294' may also be coupled to the I/O circuit 318'.

The gaming unit 130 shown in FIG. 3A may differ from the gaming units 54, 74, 75, 94, which may be represented by the block diagram shown in FIG. 3, in that the gaming unit 130 may include a modem 330. As illustrated in FIG. 3A, the modem 330 is coupled to the I/O circuit 318 by a bidirectional link. As also illustrated in FIG. 3A, the modem 330 is coupled to the network 102 by the data link 132.

The modem 330 may be any well known device that modulates digital signals into analog signals, and that demodulates analog signals into digital signals. For example, the modem 330 may be one of a pair of a digital subscriber line ("DSL") modems disposed at opposite ends of a telephone line. Such a DSL modem may be an ADSL (Asymmetric Digital Subscriber Line) modem or a VDSL (very high bit-rate DSL) modem. As a further alternative, the modem 330 may be a cable modem. As yet another alternative, the modem 330 may be an Integrated Services Digital Network ("ISDN") modem or adapter.

In turn, the data link 132 may be selected to conform to the modem selected. Where the modem is a conventional modem, the data link may include a telephone line. Where the modem is a DSL modem (whether ADSL; VDSL, etc.), the data link 132 may include a telephone line and a second modem at the opposite end of the telephone line. With a cable modem, the data link 132 may be coaxial cable; in fact, a pre-existing coaxial TV cable installation may be used. An ISDN modem or adapter may also use a telephone line, but it further requires ISDN digital-switching equipment and an external power source.

Overall Operation of System

One manner in which the system 50 and one or more of the gaming units 54 (and one or more of the gaming units 74, 75, 94) may operate is described below in connection with a number of flowcharts which may be implemented as a number of portions or routines of one or more computer programs. These programs or portions of programs may be represented as a set of instructions that may be carried out by one or more of the servers 140, 142, 144, 146 and/or the controller 310 of gaming units 54, 74, 75, 94, for example.

The programs or portions of programs may be written in any high level language such as C, C++, C#, Java, Visual Basic or the like, or any low-level assembly or machine language. The programs or portions of programs may include data files, binary files, scripts, data tables, graphic file formats, 3D models, etc. Furthermore, the programs or portions of programs may be implemented using an event-based triggering system. That is, the controller 310, for example, may generate an event (for example, in connection with a game outcome) that is in turn communicated to the display unit 274, the sound circuit 322, and a payout device, for example, the ticket reader/printer 256. Each unit or device may then determine if the communicated event has significance for that unit or device, and what that significance may be. As a result, units or device may be added or removed from the gaming unit 54 without requiring significant reprogramming of the controller 310, thereby permitting a modular approach to be implemented.

It will also be recognized that the programs or portions of programs may be stored on a machine accessible medium. A machine accessible medium includes any mechanism that provides (i.e., stores and/or transmits) information in a form accessible by a machine (e.g., a computer, network device, personal digital assistant, any device with a set of one or more processors, etc.). For example, a machine accessible medium includes recordable/non-recordable magnetic, optical and solid-state media (e.g., read only memory (ROM), programmable read only memory (PROM), erasable programmable read only memory (EPROM), electrically erasable programmable read only memory (EEPROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. According to the present embodiment, the machine-accessible medium may include the memories associated with the servers 140, 142, 144, 146 and the memories 312, 316 of the controller 310.

In regard to the gaming units 54 (and gaming units 74, 75, 94), the programs or portions of programs may be stored remotely, outside of the gaming unit 54, and may control the operation of the gaming unit 54 from a remote location. Such remote control may be facilitated with the use of a wireless connection, or by an Internet interface that connects the gaming unit 54 with a remote computer (such as the network computer 56) having a memory in which the computer program portions are stored. By storing the programs or portions of programs therein, various portions of the memories are physically and/or structurally configured in accordance with the instructions of the programs or portions of programs.

Brand Association Routine

Figure 4:
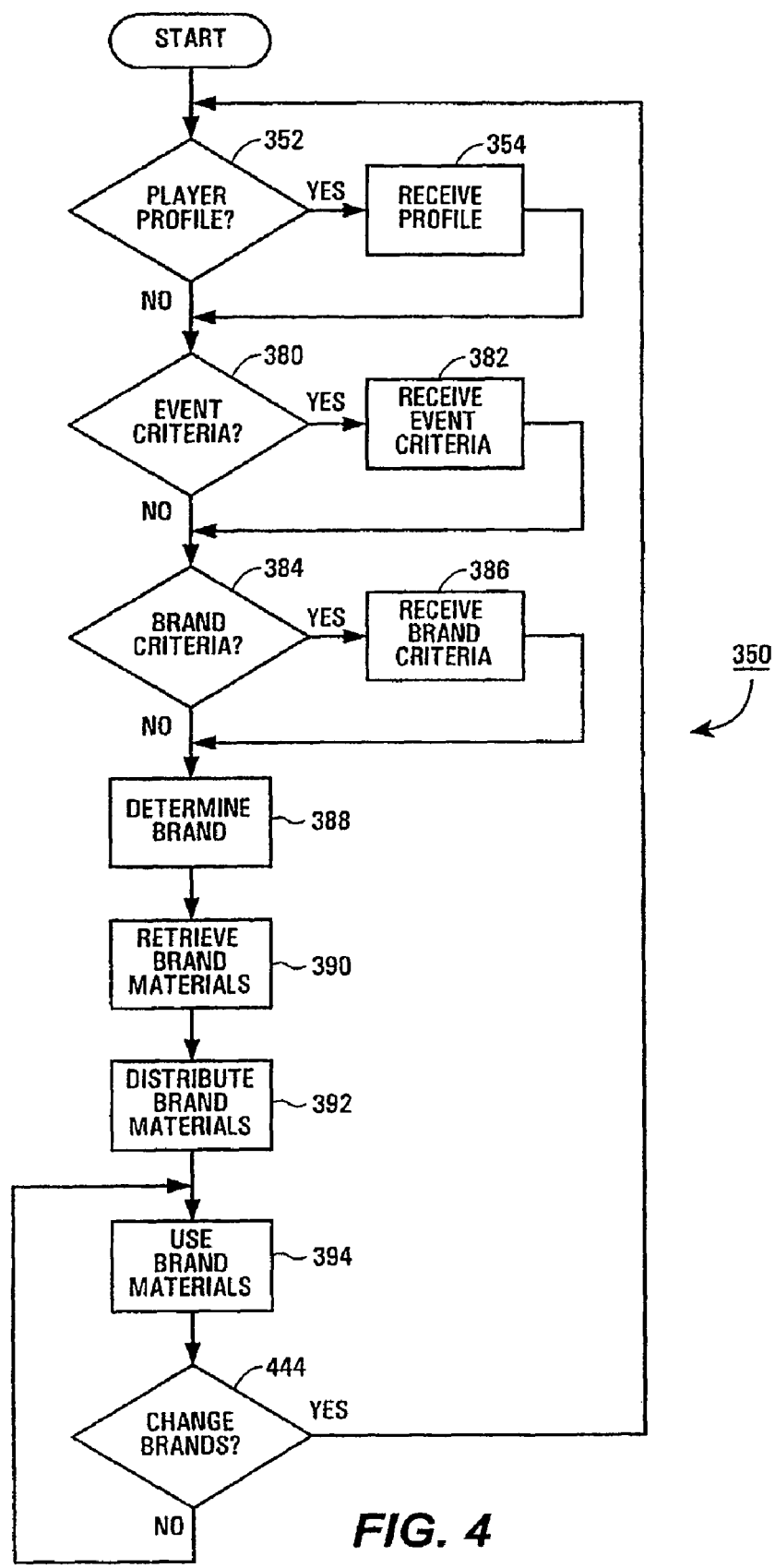
FIG. 4 is a flowchart of a brand association routine that may be performed during operation of the system 50.

FIG. 4 is a flowchart of a brand association routine 350 that may be stored in the memory of a network computer, such as the brand association server 140, or even in the memory of a gaming unit, such as the gaming units 54, 74, 75, 94, 130. In general terms, the brand association routine 350 may be used to promote associations as to one or more brands. In particular, the brand association routine 350 may promote associations as to one or more brands through various forms of advertising and/or promotional activities.

Initially, it will be recognized that while "brand association" is used in connection with the operation of the routine 350, the operation of the routine 350 may do more than form mental connections between a brand and, for example, the type and/or quality of the goods and/or services associated with the brand. The operation of the routine 350 may cause the player to be aware of a brand, the goods and/or services associated with the brand, or both the brand and the goods and/or services associated therewith. Further, the operation of the routine 350 may cause the player's recognition of the brand to increase. Consequently, "brand association" includes a variety of activities relative to the player and relating to one or more brands.

Additionally, it will also be recognized that the term "brand" as that term is used herein is not limited to only trademarks, service marks, trade dress and the like. To be sure, the term "brand", as used herein, may include trademarks, service marks, and trade dress, such marks and/or dress being registered, unregistered, or in whatever form that may be recognized by the laws of a particular jurisdiction. However, the term "brand" may also cover other devices that are not used solely or primarily to establish a connection between a particular individual or company and a particular good and/or service. In fact, the term "brand", as used herein, may include devices that may not qualify as a trademark or service mark in a particular jurisdiction, whether because the jurisdiction does not permit such devices to serve as a trademark or service mark or because the device lacks sufficient distinctiveness or association in the minds of consumers. As used herein, a "brand" may include alphanumeric combinations, words, phrases, drawings, designs, and logos.

With this by way of background, the routine 350 may begin at block 352, where a determination may be made as to whether a player profile is available in those embodiments of the routine 350 that utilize a player profile. For those embodiments that use a player profile, if it is determined that a player profile is available, the routine 350 may proceed to block 354, where the player profile may be received by the server 140 or the gaming unit 54, 74, 75, 94, 130 operating according to the routine 350.

A player profile may refer to any collection of information or data that is identified, related or associated with a player. This profile may be stored in a file in a database accessible by the brand association server 140, or it may be stored in the memory of the gaming unit 54, 74, 75, 94, 130 or the personal communication unit 64, 84, 126 used by the player. As a still further alternative, the information may be stored on a player tracking card that may be disposed into the card reader 262 of the player tracking module 260. Further, the profile may include data or information stored remotely to the server 140 or gaming unit 54, 74, 75, 94, 130, which data or information may still be considered associated with the profile.

According to one embodiment, the profile may include an identifier. The identifier may be unique to each player, like a cell phone number of the personal communication unit 64, 84, 126 used by the player to interface to the system 50, or may be unique to a group of players relative to the remainder of players on the system 50. For example, where the operator intends to distribute the personal communication units to members of a tour group, for example, the desired goal may not be for the brand association aspect of the system 50 to respond differently to each member of the tour group, but rather for the brand association aspect to respond to members of the tour group differently than to the general public. As another example, the gaming system operator may wish to target certain groups or categories of player, e.g., "high-rollers," to receive certain opportunities relative to the brand association aspect of the system 50 not available to the general public, but available to all the members of the target group. Consequently, the members of the target group may receive personal communication units with an identifier which differentiates the members of the group from the public-at-large and all other players carrying personal communication units. In this regard, some of the personal communication units may develop recognition as a status symbol item as well as performing a practical function.

Moreover, more than one identifier may be assigned to a profile, or stated slightly differently, one profile may be associated with more than one identifier. For example, a particular profile may be associated with a first identifier which indicates that the associated player belongs to a first group, e.g., the "high-roller" group, and with a second identifier which indicates that the associated player belongs to a second group, e.g., the "ultra high-roller" group, which may or may not be exclusive of the first group. Moreover, the second identifier may be unique relative to all other identifiers, such that the associated player may be differentiated from all other players.

The profile may also include one or more records that may contain data about the characteristics, habits and/or preferences of a player associated with the identifier. For example, the profile may include basic personal data that will be stored in a personal data record, including such data as the name, address, Social Security number, date of birth, nationality, language skills, and cultural preferences of the player. The personal data record may also contain important dates, such as birthdays, anniversaries, and other occasions. The profile may also include data regarding the player's favorite foods, shows, prizes, complementaries ("comps"), and the like, this data being stored in an entertainment record and/or a personal prize preferences record. The profile may also include the player's preferences regarding the look of the game displayed, or the types or levels of sensory outputs utilized during the game. Further, the profile may include the player's preferences regarding the brand association materials that the player is willing to or wishes to receive, or, conversely, the brand association materials that the player is not willing to or does not wish to receive. For example, a player that enjoys water sports may wish to receive brand association materials regarding a water park, while a non-drinker may not want to or wish to receive advertisements regarding alcohol.

Such records may be created and/or updated manually. That is, the player may enter the data personally, through the use of one or more of the gaming units 54, 74, 75, 94, 130 configured to permit such data entry or via the Internet from a remote location, through the use of a computer that may or may not be configured as a gaming unit. As an alternative, the player may answer questions on a questionnaire, and an employee of the network or system operator may enter the data into the system 50.

Such records may also be created and/or updated by the system 50. For example, the system 50 may generate and maintain a bonus record including a running total of the value wagered by the player and bonuses awarded therefore, and this may be associated with the profile. This information may be obtained, for example, through the use of the player tracking server 142 and associated player tracking modules 176. Extending beyond the monitoring of gaming information, the system 50 may also keep track of information of a player's use of other aspects of an operator's property or properties. Further, the system 50 may generate some of this data by analyzing the movements of the player to restaurants, theaters, etc. This data may then be stored in the entertainment record. Where the player accesses the Internet through the use of the system 50 or where the player permits the operator to track his or her use of the Internet through other methods, the system 50 may establish other records reflecting Internet usage. For example, the system 50 may track the products or services (e.g., travel) purchased by the player over the Internet, or the sites visited or searches run by the player while on the Internet, and store such information in an Internet usage record. As one such example, the system 50 may have relationships with third-parties Internet companies who, with the permission of the player, make the information available to the operator to permit prizes to be selected according to the player's Internet habits. Alternatively, this information may be provided to the operator, with the player's permission, in exchange for providing Internet access via one of the gaming units 54, 74, 75, 94, 130 or personal communication units 64, 84, 126.

Not all information has to come from either the player or the system 50. For example, both the player and the system 50 may generate data about the player's gaming preferences (e.g., favorite casino games) to be stored in a gaming record. Similarly, both the player and the system may generate (through data analysis) data about the player's wagering preferences to be stored in a wagering record. This data may include whether the player prefers to always bet the maximum, to always bet the maximum on certain games, to always bet a certain amount on certain value games, etc.

The player profile may be received by the server 140 or the gaming units 54, 74, 75, 94, 130 at block 354 in a variety of manners. For example, the player profile may be uploaded to the brand association server 140 or gaming unit 54, 74, 75, 94. Specifically, the player profile may be uploaded from a personal communication device 64, 84, 126 or from a player tracking card disposed into the card reader 262 of the player tracking module 260. As a further alternative, the player profile may be uploaded from a plurality of storage locations, for example from the player tracking server 142 in addition to from a personal communication device 64, 84, 126 or a card disposed into the card reader 262. As a still further alternative, the player profile may be created and stored in the memory associated with the server 140 or gaming unit 54, 74, 75, 94, 130, rather than being retrieved from a memory storage location.

Figure 5:
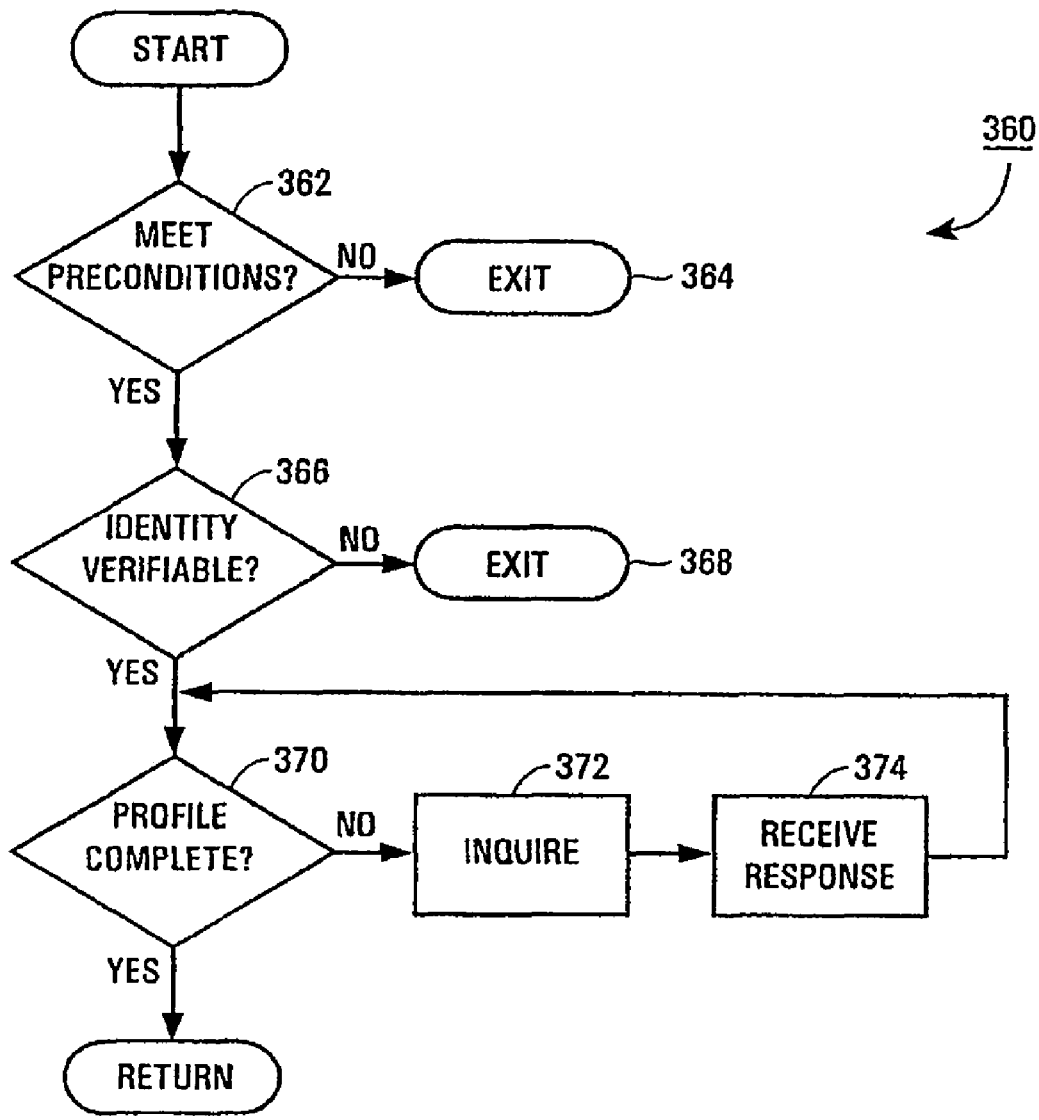
FIG. 5 is a flowchart of a routine for establishing a player profile that may be used in conjunction with the brand association routine of FIG. 4.

As an example of this later alternative, a registration routine 360 is shown in FIG. 5. The registration routine 360 may be carried out using devices and personnel of the network operator, or the routine may be carried out using devices of the system 50 but without the assistance of personnel of a network operator. As one example, an employee of the network operator may register players at a specific location set up for this purpose (e.g. at the concierge desk), or may "roam" a casino floor to perform this service wherever the player is located. Alternatively, the player may register him or herself over the Internet, at a kiosk (such as kiosk 88) established for registration at the casino, or at gaming units adapted to permit registration to occur.

Initially, the player is queried at block 362 to determine if the player meets certain preconditions before registration can continue. These preconditions may include information regarding the location of the player at the time the player is accessing the brand association aspect of the system 50, or the location of the player's place of residence. Some jurisdictions may prohibit or limit the use of the brand association aspect of the system 50 described herein, or place certain limitations on the types of people that may use the brand association aspect, particularly in conjunction with the gaming units 54, 74, 75, 94, 130. Thus, the preconditions may also include information regarding characteristics of the player. For example, some jurisdictions may prohibit players of a certain age from using the brand association aspect described herein or from using the brand association aspect described herein in conjunction with the gaming units 54, 74, 75, 94, 130. Other jurisdictions may prohibit players that reside in certain locations from using the brand association aspect, while still others may maintain lists of certain persons that are not allowed to use the brand association aspects of the system 50 discussed herein. The player may provide the information concerning him or herself in a variety of manners, depending on the method by which registration is occurring. For example, if the registration is occurring within a casino property and a casino employee is assisting the player in completing registration, some information (such as the location of the player) may be self-evident and other information may be gathered by the casino employee (for example, through the use of a questionnaire). Alternatively, if the registration is occurring at a location remote to the casino property, the player may provide this information by way of an on-line questionnaire that is submitted over a network connection (such as the Internet) to the server 140. As a still further possible precondition, certain types of security measures may need to be implemented before the player can take advantage of the brand association aspect of the system 50; for example, certain level of type of encryption may be required to be use the brand association aspect of the system 50. If the player cannot provided the required information, or if the information shows that the player does not meet the preconditions, the routine exits at block 364 and the player is prevented from using the brand association aspect of the system 50.

Assuming that the information provided at block 362 indicates that the player meets the preconditions, the routine 360 proceeds to a block 366, and the player may be required to verify one or more aspects of the information provided in regard to the information provided at block 362, or to provide additional information that may be used to identify the player in the future, thereby providing an increased likelihood that a person using the player's profile is indeed the player or one of a group of players, where a common profile is used for a group of players. Here as well, if the information is unavailable, if the player refuses to provide the information, or if the verification cannot be completed, the routine exits at block 368.

It should be noted that the block 366 may be optional. That is, according to the regulations of the particular jurisdiction and the policies of the network operator, the information provided at block 362 need not be verified using a source of information separate from the player, but it may. Additionally, the operator may determine that it is not necessary to ensure that a registration is being used by a particular person or one of a particular group of people. In such a circumstance, additional information regarding the identity of the player or players need not be gathered. According to an embodiment, the determination of block 366 may be omitted where the operator can limit access by, for example, underage players to the gaming units 54, 74, 75, 94 (for example, in a casino-type gaming environment as opposed to an Internet-type gaming environment, as may be represented by the gaming unit 130).

However, if required, information verifying the data provided concerning the preconditions at the block 362 may be verified at the block 366. For example, according to an embodiment wherein the player is registering at a casino property and is being assisted by a casino employee, the casino employee may ask the player for a picture identification card to verify that the person providing the information is who he or she is who they say they are, and to verify, for example, age information provided to complete the precondition qualification at block 362. Alternatively, where the player is performing the registration at a site remote to the casino floor, for example in a casino hotel room or at home, the player may need to use, for example, one or more devices coupled to the gaming unit or personal communication unit which they are using to interface with the system 50. As one such embodiment, to verify the location of a gaming unit located off the casino floor or outside the gaming system operator's property, the gaming unit may be associated with a device that provides location data for the gaming unit that may be transmitted to the gaming system operator. For example, the Global Positioning Satellite (GPS) system may be utilized by associating a special transceiver with the gaming unit. As a further example, the gaming system operator may require the player to connect to the system 50 using a cellular mobile station (or at a minimum to make a call using the mobile station or to turn the cellular mobile station on during play). The gaming system operator may then access the location information available to the cellular system operator after the cellular system operator has processed the cellular transmission data from the mobile station (such as may be done in providing enhanced 911 (or E-911) service, for example). Alternatively, the player may be required to connect to the system 50 from a land line (or to call the gaming system operator using a land line telephone during the verification process), whereupon the gaming system operator may check the telephone company's records to verify the number and pull the street address associated with the number. As a further alternative, where the player has connected to the system 50 over the Internet, the gaming system operator may check the IP address of the gaming unit and of the Internet service provider, and obtain a street address from the Internet service provider.

Similarly, the operator may require the player to provide information that will be used at the present time and/or in the future to verify the identity of the player or players associated with a particular registration and/or profile. For example, the player may provide a form of identification (such as a fingerprint or other form of biometric data, driver's license, or national identity card) that the gaming system operator may use to access age data established by a third party (for example, the state department of motor vehicles). As a further alternative, the camera associated with the gaming unit may be used to monitor the player using the gaming unit 54, 74, 75, 94, 130.

Assuming that the preconditions are met at the block 362 and verification is provided, if required, at the block 366, the routine 360 proceeds to block 370, where the determination is made as to whether the profile for the registration is complete. If the registration is not complete, the routine may proceed through blocks 372, 374 as necessary to gather the information necessary to complete the player's profile. When the profile is complete (as determined at block 370), the routine returns to routine 350 in FIG. 4.

After receiving the player profile at block 354 or having determined that there is no player profile to receive at block 352, the brand association routine 350 proceeds to block 380. At block 380, the routine 350 determines if there are event criteria to be received by the brand association aspect of the system 50. If there are event criteria to be received, the routine 350 proceeds to block 382.

For example, according to certain embodiments of the present disclosure, it may be desirable to receive certain event criteria that may be utilized to select a brand from a plurality of brands in regard to which advertising and/or promotional materials may be provided to one or more players. Such event criteria may include game play events (e.g., a particular combination of game elements, a particular series of combinations of game elements, a bonus round trigger event, a progressive level trigger event), player tracking events (e.g., card-in, elapsed gaming time, number of coins in or out, rate of coins in or out), timed events (e.g., at a particular time of the day, on a particular day of the year, at a predetermined time, at a randomly selected time) and promotional events (e.g., to encourage use of underutilized machines, to encourage participation in a tournament). Other events may also be included.

As was the case with the player profile, these event criteria may be uploaded from a memory storage location elsewhere in the system 50, or may be preloaded onto the server 140 or gaming unit 54, 74, 75, 94, 130. As a further alternative, the event criteria may be inputted and stored at the time block 382 is executed.

After the event criteria is received at block 382 or if it is determined at block 380 that no event criteria is to be received, the routine 350 proceeds to block 384. At block 384, a determination is made as to whether there are criteria to be uploaded or entered in regard to the brand to be selected. If there are criteria to be uploaded or entered, the routine 350 proceeds to block 386. If there are no criteria to be uploaded or entered, the routine 350 proceeds to block 388.

The brand criteria may include a variety of concerns relating to the brands themselves and the brand-promoters associated with the brands (which may be the manufacturer or retailer of the goods and services associated with the brand, or may be an intermediary acting on behalf of such manufacturer or retailer, for example). For example, a criteria may be established for a specific brand that advertising and promotional materials concerning the brand will only be distributed to players that have a preference not only for a particular good or service associated with the brand, but also for the particular brand itself. As another example, where a particular brand-promoter sponsors a particular event (such as a tournament) or a particular prize offered for play of a particular group of gaming units 54, 74, 75, 94, the advertising and/or promotional materials of that sponsor/brand-promoter may be given a priority or preference over the advertising and/or promotional materials of other brand-promoters relative to those gaming units 54, 74, 75, 94. As a further example, the advertising and/or promotional materials relating to another, competitive brand may not be displayed on the gaming units 54, 74, 75, 94 during the time the particular event or prize is offered. Alternatively, the brand criteria may relate to agreements made between the operator of one or more of the networks 52, 72, 92 and the brand-promoter. For example, the network operator may guarantee a certain number of placements to a particular brand-promoter for a specific brand. As a further example, where the brand-promoter has been guaranteed a certain number of placements of advertising and/or promotional materials within a certain time period, and the time period is drawing to a close with a significant number of placements still to be made, the brand may have a weighted or preferred status relative to other brands and to placement.

As was the case with the player profile and the event criteria data, the brand criteria data may be uploaded from a memory storage location elsewhere in the system 50, or may be preloaded onto the server 140 or gaming unit 54, 74, 75, 94, 130. As a further alternative, the brand criteria data may be inputted and stored at the time block 386 is executed.

Once the brand criteria has been stored or uploaded at block 386 or the determination has been made at block 384 that there is no criteria to store or upload, the routine 350 proceeds to block 388. At block 388, a determination is made of a brand from among a plurality of brands. The determination may involve a consideration of the player profile, the event criteria, the brand criteria, or any combination thereof. Alternatively, the determination may not require a consideration of any of a player profile, an event criterion or a brand criterion. Once the determination is made, the routine 350 proceeds to block 390.

The determination of which brand to feature relative to a specific player or group of players may include matching information contained in one or more of the data records to one or more of the criteria related to a particular brand. For example, a particular brand criteria related to a particular brand may require that the player have a preference for the good and/or service related to the target brand. The brand criteria may also require that the player have a preference for a related good and/or service that marketing studies have shown is a common preference for persons who are repeat purchasers of the good and/or service offered in connection with the target brand. Players who match the brand criteria may be included in the distribution list for the materials related to the brand associated with the brand criteria, and players who do not match are not included in the distribution list.

The event criteria may be used in combination with the matching of the player profile data and the brand criteria, or in substitution therefor. For example, the operator of one or more of the networks 52, 72, 92 may determine that they do or do not want to distribute brand association materials during certain times of the day. One network operator may wish to prevent the distribution of brand association materials during a certain time of the day, week, month or year when players typically are the most active, under the assumption that the display of the brand association materials will distract the players from their gaming. Alternatively, a network operator may decide to target the same time period for increased distribution of brand association materials because he or she knows that an increased number of possible recipients will be available during that time period. As another example, a network operator may set an event criterion which is tied into the brand criteria, such as an event criteria which signals the beginning of a tournament and a brand criteria that places preference on the advertising and/or promotional materials of the sponsor/brand promoter.

As an alternative, the determination of the brand may rely in part or not at all on the matching of player profile data with event and brand criteria, the ultimate determination of the selected brand being made according to an exchange of communications between the network operator and the brand promoter. For example, the matching of player profile data with event and brand criteria may be used to narrow the group of potential brands from a larger number of possible brands, but not to select a specific brand. As another example, the matching of player profile data and event and brand criteria may be used to weigh the possibilities that one brand will be selected over another, without actually making the final determination as to which brand will be selected. However, at the end of the determination, the brand is selected according to an exchange of communications between the network operator and the brand promoter, for example in the form of an auction or reverse auction.

That is, it may be determined, based on the player profile, event criteria and brand criteria, that a group of three hundred players could be a target audience for the advertising and/or promotional materials of any one of three brands. Moreover, based on other event and brand criteria established by the network operator, the advertising and/or promotional materials of only one of the three brands may be distributed at the present time. The network operator may send a request message via the network 160 (which may represent the Internet) to the servers 168, 170, 172 associated with each of the three brands, the message stating that a target audience of three hundred players has been identified for the brand in question and requesting a bid if the brand promoter for the identified brand wishes to secure the right to distribute the advertising and/or promotional information to the target audience. The bid might be requested in currency or in kind (such as a certain number of prizes each having a net worth equal to a certain amount of value). In response, one, two or all of the brand promoters may transmit offers to the server 140. The network operator associated with the brand association server 140 must then decide which offer to accept in regard to the target audience. In this fashion, not only the player profile, event criteria and brand criteria determine the brand selected, but the exchange of communications (in the form of an auction) also determines the brand selected.

Of course, an auction is not the only kind of exchange of communications that might be used to make the determination as to the brand selected. For example, the player profile data, in combination with the event criteria and brand criteria, may be used to form a ranked list of potential brands. The network operator may then send an offer for a bid (in currency or in kind) to the brand promoter associated with the highest-ranked brand, and if the brand promoter accepts, the determination process is over; otherwise, the network operator sends a communication to the brand-promoter associated with the next name on the list, and so on. As another example, the network operator may need a certain number of prizes for a promotion to be used in conjunction with a group of players having certain common likes or dislikes, and the operator may provide a communication to a number of brand-promoters requesting bids for the opportunity to provide the prizes needed to the audience described.

As a still further method for the determination of the selected brand, the determination may be made without consulting player profile data, event criteria or brand criteria, and without resort to communicating with the brand-promoter at the time the determination is made. Instead, the determination may be made according to an input received by the server 140 or gaming unit 54, 74, 75, 94, 130 operating according to the routine 350, the input resulting in the determination of the selected brand. This input may be in the form of a ticket or coupon that may be disposed into the ticket reader 256 or a card that may be disposed into the card reader 262, the ticket, coupon or card including an instruction which is used by the server 140 or gaming unit 54, 74, 75, 94, 130 to determine which brand is to be used. In a variant form, for use with a gaming unit without a ticket reader 256 or card reader 262, such as the gaming unit 130, the input may be in the form of a password instead. According to any such embodiment, the determination is made after the input is received.

As one example of such an embodiment, a ticket, coupon or card may be provided to a player during the play of a game at one of the gaming units 54, 74, 75, 94, 130, using, for example, the ticket reader/printer 256, 256'. Alternatively, the ticket, coupon or card may be provided to a player during as part of a special event (such as a tournament) relating to the casino related to one of the networks 52, 72, 92. As a further alternative, the ticket or coupon may be provided to the player by the brand-promoter, perhaps in connection with the sale of the good and/or service associated with the brand (for example, at a vending machine or a retail establishment) or as part of a mailing campaign.

And another embodiment, the selection may be performed in whole or in part by the player. That is, the server 140 may display a number of brands available, for example by generating an image on the display unit 274, and the player may a select a brand from the brands displayed, using a touch screen associated with the display unit 274 or some other player input device, such as a button. According to one variation, the brand distribution aspect may be programmed to display one or more brands, and the player is permitted to select any one of the brands displayed. According to another variation the brand distribution aspect may start with a first plurality of brands, the server 140 may be programmed to use one or more of the player profile, the event criteria and the brand criteria to reduce the number of brands to a second plurality, and then the player is permitted to select one of the second plurality of brands, which selected brand will be used hereafter. For example, the player profile may be used to eliminate certain brands based on the players' willingness to accept certain advertisements or the players' desire not to receive other advertisements. Other variations are possible.

Once the brand is determined at block 388, the brand materials are retrieved at block 390.

The brand materials may include a variety of possibilities. For example, the brand materials may include advertising information. The brand materials may include video or audio information associated with the brand, such as a particular logo, slogan, or jingle. The video information may in the form of stills or video clips, and may be incorporated into the images that make up the game aspect of the system 50, or may be separate from the images involved in game play. The audio information may be in the form of audio or sound clips, and may also be incorporated into the sound effects that normally make up the game aspect of the system 50 (e.g., the sound effect jingle for the selected brand may be generated when a payout is awarded that includes a good or service of the selected brand), may be coordinated with the display of the video information associated with the selected brand, or may generated separately from the images involved in game play and the images associated with the selected brand. The brand materials may also represent bonusing opportunities not available to the general public, but only to players that have received the brand materials. The brand materials may further include prizes that are selected according to the brand (such as goods and/or services associated with the brand). Perhaps in conjunction with the prizes selected according to the brand, the brand materials may include modifications to be made to a paytable or a downloadable paytable. As a further alternative, the brand materials may include links which may provide a conduit for further information and/or prizes associated with the brand.

These materials may be already stored in memory somewhere on the system 50 for retrieval. However, where the brand is determined through a bargaining session, such as an auction, for example, the materials may need to be retrieved from a remote server associated with the brand-promoter that is associated with the brand selected at block 388. Moreover, where the materials involved are prizes, the actual materials may not be transferred to the network operator, but instead other items representative of the prizes (such as a photograph or illustration of the prize) may be transferred to the network operator for use and/or display to the players.

Once the materials have been retrieved at block 390, the routine 350 proceeds to block 392, where the materials are distributed. The downloading of the materials at block 392 may be a direct download of materials from the server 140 to a storage device associated with a player, such as gaming unit 54, 74, 75, 94 or personal communication unit 64, 84, 126. Alternatively, the materials may be distributed using the servers 144, 146 illustrated in FIG. 1A, for example. That is, the brand association materials may be downloaded to an intermediary server, such as the gaming machine download server 144 and the communications server 146. Then, at a later time, the server 140 may provide a command, or event, that is then communicated to all of the servers in the system 50. In response to the event, the individual servers determine if the event has significance for them, and, if so, what the significance might be. For example, the server may send a particular event that causes a download of brand materials from the gaming unit download server 144, but which the communications server 146 may ignore. In the alternative, the server may send a particular event that causes a download to occur from the gaming unit download server 144 and the communications server 146 at approximately the same time (for example, a holiday). However, even if the servers 144, 146 are generally synchronized as to the time of the distribution of the brand association materials according to the event sent, the servers 144, 146 may download different brand association materials.

Once the materials have been distributed to the devices where the brand materials will be used, such as gaming units 54, 74, 75, 94 or personal communication units 64, 84, 126, the materials may be used to present information regarding the selected brand at block 394. This information, as discussed previously, may include advertising information and/or promotional information. Examples of the information and its use in the brand association aspect of the system 50 are illustrated in FIGS. 6A, 6B, 7 and 8.

Figure 6A:
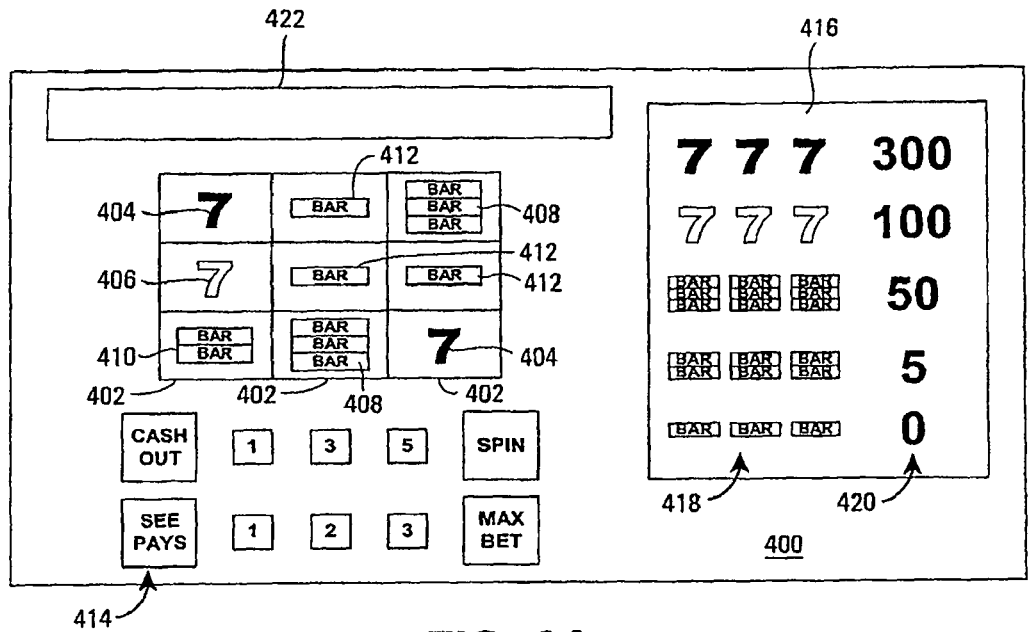
FIG. 6A is an illustration of an embodiment of a visual display that may be displayed during performance of a slots routine.
Figure 6B:
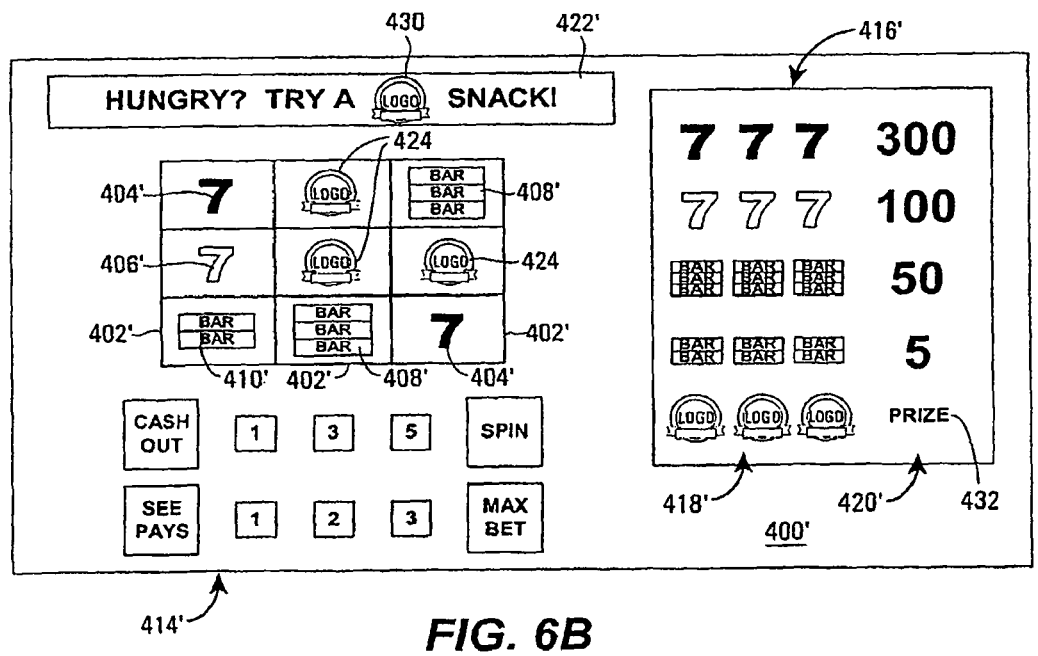
FIG. 6B is an illustration of an embodiment of a visual display that may be displayed during performance of a slots routine as modified according to the brand association aspect of the system 50.

Turning first to FIGS. 6A and 6B, it will be recognized that FIG. 6A illustrates an image 400 that might be displayed on the display unit 274 of a gaming unit (such as one of the gaming units 54) during the operation of the gaming unit 54 according to a slots game. The slots game image 400 may include a number of reels 402, each reel having a plurality of symbols 404 (black "7"), 406 (white "7"), 408 (triple bar), 410 (double bar), 412 (single bar) displayed thereon. The slots game image may also include buttons 414, such as a "Cash Out" button, a "See Pays" button, a "Spin" button, a "Max Bet" button, a plurality of payline buttons, and a plurality of bet buttons, the operation of each of which has been explained above relative to FIG. 2A. The image 400 may also include a paytable 416. The paytable 416 includes a listing of certain combinations 418 and the associated payouts 420. The image 400 may also include one or more areas 422 in which nothing is shown in the image 400 of FIG. 6A (while the area 422 is surrounded by a rectangle, the rectangle is for illustrative purposes only, and does not necessarily mean that a rectangularly-shaped border need be shown in the image 400 of FIG. 6A).

FIG. 6B illustrates the image 400, now designated 400', as modified according to the brand association aspect of the system 50. While a number of modifications have been made to the image 400' in keeping with the brand association aspect of the system 50, this is not to suggest that all of the modifications must be made in combination. Rather, the modifications may be taken individually or in combination, whether that is the combination illustrated in FIG. 6B or some other combination.

Figure 7:
FIG. 7 is an illustration of an embodiment of a visual display that may be displayed during performance of the brand association routine.

To begin, one or more of the symbols 404', 406', 408', 410', 412' may be replaced with material associated with the selected brand on the reels 402'. In the example illustrated, the symbols 412' have been replaced with an image 424 (which includes pictorial and textual elements) that is associated with the selected brand ("LOGO"). According to other embodiments, all of the symbols 404', 406', 408', 410', 412' may be replaced with different images associated with the selected brand. These symbols 424 may be static—that is, the symbols 424 may be used in the display of outcomes in regard to the slots game only. Alternatively, and in combination with a touch screen associated with the display unit 274, the symbols 424 may be dynamic—that is, the symbols 424 may serve as buttons which activate links to other materials related to the selected brand as well as being used in the display of outcomes in regard to the slots game. For example, by touching the area of the touch screen associated with one of the symbols 424, a signal may be generated that is received by the server 140. In response, the server 140 may retrieve a webpage from a website associated with the selected brand, for example, as shown in FIG. 7. The player may then navigate the website associated with the selected brand using input devices on the web pages, such as the buttons 426, 428 shown in FIG. 7.

It will be further recognized that, while an example has been discussed wherein symbols related to the selected brand are displayed in place of symbols typically displayed in the slots game, this modification is not limited to the type of game discussed or the game elements used to play such game. That is, if the example discussed previously had been a card game, such as video poker or video blackjack, the symbols 424 could have been displayed in place of one or more of the denominations, such as all jacks, queens, kings or aces. Moreover the symbols may be displayed on such cards separate apart from the markings representing the suits and denominations. For example, each card may have the symbol disposed in the center of the face of the card irrespective of the suit and denomination of the card. Moreover, as indicated above, the symbol may be static or dynamic. Similar modifications may be made to keno cards, bingo cards, die, and the like.

As also is shown in FIG. 6B, advertising information about the selected brand may be displayed in the area 422'. This advertising may be static, or may be animated. Similar to the symbols 424, the area 422' may be dynamic, such that when a player touches the touch screen in the area 422', a signal is sent to the server 140 to pull up an advertisement or a webpage, such as shown in FIG. 7. Alternatively, only sections of the area 422' may be dynamic—for example, only the region overlying the "LOGO" symbol 430. For that matter, a symbol 430 may be displayed as part of the image without any accompanying advertising material, such as the text displayed in the area 422'.

As is further shown in FIG. 6B, the paytable 416' may be modified as well, whether that paytable is of the primary game provided by the gaming unit, or a bonus or secondary bonus game or event. While the modification of the paytable 416', as shown, includes substituted game elements 424 and a substituted payout in the form of a prize 432, which may be, for example, a good or a service associated with the selected brand, the modification of the paytable 416' need not include both modifications at the same time. That is, it is within the scope of the present disclosure for such a modification to be made, but it is also within the scope of the present disclosure for only the game elements 424 to be substituted for the game elements existing in normal operation of the gaming unit or for only the payout to be modified, the payout being associated with the selected brand but the game outcome (as represented by the combination of game elements) being identical to that which occurs in the normal operation of the gaming unit.

This modification may be made by reprogramming a section of the existing paytable at the gaming machine to include a game element or a prize that is associated with the selected brand. The reprogramming of the paytable may include alteration of the original code or original associated data structures that represent the paytable to include one or more gaming elements associated with the selected brand (such as game elements 424) or a payout associated with the selected brand. Alternatively, the code or associated data structures may be originally written so as to permit the insertion or substitution of one or more game elements 424 or one or more prizes into the paytable after the code or associated data structure is stored in the memory of the gaming unit. For example, the stored paytable may include one or more game outcomes (which may be represented by one or more combinations of game elements, such as symbols on a slot machine) that are not associated with a payout or are associated with a lesser value payout according to the normal operation of the gaming unit, but that may be later associated with a payout without altering the underlying paytable code.

Alternatively, the modification of the paytable may be performed by downloading a new paytable to the gaming unit, which paytable is then implemented by the gaming unit. While the paytable is referred to as "new", the paytable may be new only in relation to the game elements that may result in game outcomes associated with payouts or the payouts that may be provided, the frequency and the size of the payouts remaining substantially unchanged relative to the paytable used by the gaming unit in the normal operation of the gaming unit. For example, the paytable may remain unchanged as to the size and the frequency of all payouts, except that a prize associated with the selected brand is now provided as a payout for a game outcome (which may be represented by one or more combinations of game elements, such as symbols on a slot machine) that previously had no prize associated therewith or only a lesser value payout associated therewith. Moreover, this game outcome may now include game elements 424 associated with the selected brand. As another alternative, however, not only is one of a good and a service associated with the selected brand incorporated into the payouts offered, but the frequency and/or size of the payouts provided also may be changed.

The new paytable may be one specifically written for the selected brand, or may be written for the inclusion of brand prizes without a particular brand in mind. As one example of the former case, the new paytable may include one or more prizes, which prizes are one of a good or a service associated with a selected brand. As one example of the later case, the new paytable may include one or more prizes, which prizes are one of a good or a service that have a certain value or a certain range of values, whether the value is the amount that it costs the sponsor or system or network operator to provide the prize or the player to select and receive the prize. The paytable is particularized for a selected brand at a later time, whether that is at the time of download to a software distribution server, at the time of download to the gaming unit, at the time of use, in accordance with a particular event, etc., by including in the paytable the good or service of the selected brand that matches or most substantially matches the value or range of values established in the new paytable. It will be recognized that an identification other than value may be used for cross-reference of the prizes of different brands for inclusion in a paytable established for the goods and services of more than one brand; for example, the identifier may be one that is peculiar to the brand association aspect of the system 50, unlike value which may have denominations and ready comparability even outside of the brand association aspect of the system 50.

As a further alternative, the modification of the paytable may be implemented without changing the paytable of the gaming unit so as to insert or substitute game elements or a good or a service associated with the selected brand, or the size and/or frequency of the payouts awarded. For example, the paytable modification may come in the form of a payout enhancement that is associated with the selected brand, but that is applied to some or all of the payouts determined as a consequence of the normal operation of the gaming unit in the primary gaming mode or a bonus or secondary gaming mode. Such a paytable modification may be a multiplier that is applied to all payouts according to the selection of a particular brand, or a prize that is awarded in combination with a payout above a threshold value and according to the selection of a particular brand. Such a paytable modification may be combined with the display of advertising material associated with the selected brand to remind the player as to the brand associated with the paytable modification being applied.

As seen in the particular illustration of FIG. 6A, according to the paytable 416 used during the normal operation of the gaming unit, the combination of three bars (symbol 412) is associated with a zero payout according to the normal operation of the gaming unit. However, according to an embodiment of the brand association routine 350 where the single bars 412' are replaced with the brand symbols 424, the paytable 416' may be modified such that three brand symbols 424 are now associated with the prize 432. According to one embodiment of such a modification, the prize may be a good or a service related to, and perhaps provided by, the brand-promoter associated with the selected brand.

Figure 8:
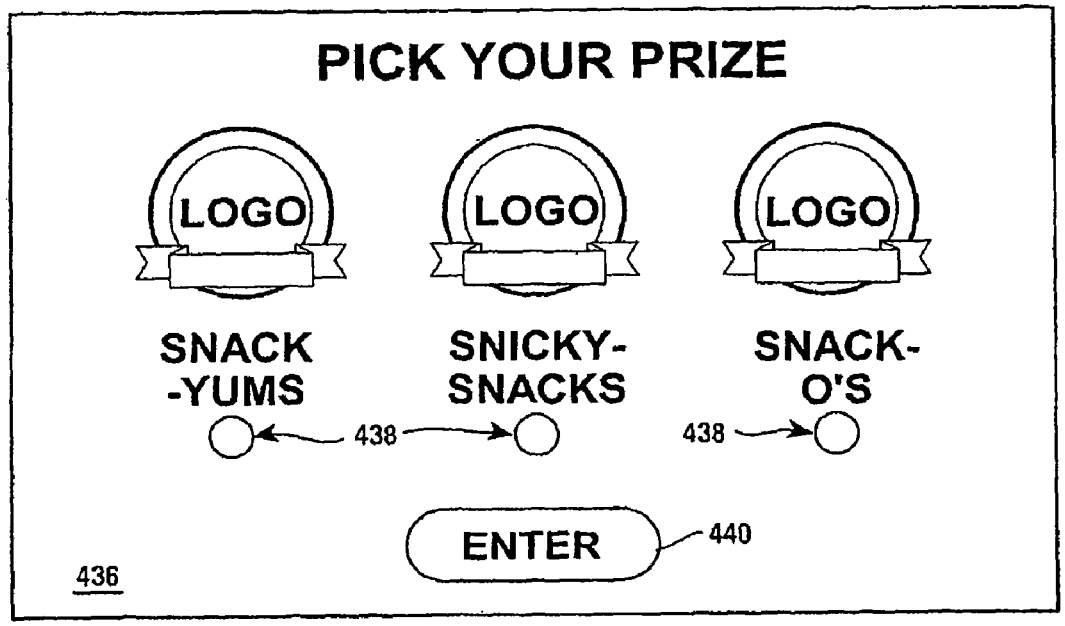
FIG. 8 is an illustration of an embodiment of another visual display that may be displayed during performance of the brand association routine.

For example, when three symbols 424 are displayed, indicating an outcome for which a "prize" is associated, the image 436 shown in FIG. 8 may be displayed on 'all or' part of the display unit 274, and may represent a form. In accordance with this particular example shown in FIG. 8, the player is permitted to select his or her prize from among three prizes, each of which may be associated with the selected brand. As shown, the player may select the LOGO Snack-Yums product, the LOGO Snicky-Snacks product, or the LOGO Snack-O's product by activating the radio button 438 disposed below the text describing the prize option, which text may be replaced with or be used in combination with an illustration or photograph of the prize instead. Once the player has made his or her selection, the player may depress an enter button 440.

The form may be transmitted, for example, to the server 140 if the network operator is in charge of distributing the prizes, or to one of the servers 168, 170, 172 if the brand-promoter is in charge of distributing the prizes. Once the form has been received either by the server 140 or one of the servers 168, 170, 172, a further transmission may occur from the server 140, 168, 170, 172 to other servers, or to a fulfillment center, where personnel of the network operator or brand-promoter handle fulfillment of the prize request. Alternative, the server 140, for example, may control the ticket printer 256 associated with the gaming unit 54 to print a coupon or ticket which may be taken to a location within a casino associated with the network 52 for redemption. The coupon or ticket may, likewise, be redeemable at a retail establishment, perhaps even a retail establishment associated with the brand-promoter associated with the selected brand.

It is believed that the modifications to the paytable discussed above may be readily approved by the relevant regulatory authorities. That is, where the paytables discussed above involve the inclusion of a prize payout for a game outcome that had no payout or only a lesser value payout associated therewith, such a paytable may be beneficial to the player in that the paytable gives the player an additional possible winning combination where none previously existed. It is believed that governmental regulatory authorities are generally more inclined to approve of the use of such paytables where the player is receiving more than they would have received under a preexisting paytable. It will be recognized that this argument may be strongest where the modified paytable does not modify the frequency and size of the paytable used by the gaming unit in normal operation, but only includes a payout for a gaming outcome that previously had no payout associated therewith or includes a payout in addition to an existing payout. It is further believed that this argument may favor obtaining approval of such a paytable even when the specific prize or prizes to be distributed for game outcomes previously unassociated with a payout or associated with a payout of lesser value are not specifically identified, but the value or range of values of the prize to be distributed are identified (e.g., in the situation where the good or the service to be provided is not specifically known until the brand is selected and the paytable is downloaded, implemented in the gaming unit, etc.).

As a further alternative to the embodiments discussed above, wherein the paytable was modified to include a good or a service associated with the selected brand, it may be that the paytable is modified such that one or more of the game outcomes (such as, for example, the combinations of three symbols 424 shown in FIG. 6B) may result in a payout of "brand points" rather than in currency or in kind. For example, the combination of three symbols 424 may result in a number of points being awarded to the player, which points may be redeemed for prizes such as goods and/or services from the brand-promoter associated with the selected brand. The player may be able to redeem the points by connecting to a web site associated with the brand, or by visiting a retail establishment operated by the brand-promoter. To permit the points to be portable, the server 140 or gaming unit 54, 74, 75, 94, 130 may control an associated ticket printer 256 to print a ticket for the amount of points awarded according to the brand association aspect of the system 50.

Returning to FIG. 4, it will be noted that at block 444, the routine 350 may determine that the brand should be changed. For example, the brand materials associated with a specific brand may only be displayed for a limited time period, in accordance with an event criterion or a brand criterion. Alternatively, the event, which caused the brand materials of a particular brand to be distributed and used, may be complete. As such, during a gaming session of any significant duration, brand materials associated with a plurality of brands may be displayed. In fact, this may not only be possible, but may be desirable to the operator of the networks 52, 72, 92. If the determination is made at block 444 that the brand should be changed, the routine returns to block 352, otherwise the routine 350 may return to block 394.

It will be recognized that while the routine 350 may return to block 252 if the determination is made to change the brand, it may not be necessary to repeat each one of the determinations made at blocks 352, 380, 384. That is, once a player's profile is stored so as to be accessible to the server 140 operating according to the brand association routine 350, it need not be stored for a second time if the determination is made to change the brand relative to the player. Similarly, the determinations at blocks 380, 384 not need to be repeated. Eliminating the repetition of such determinations may reduce the processing load on the system 50 by reducing the number of redundancies in the operation of the routine 350.

Main Gaming Routine

Figure 9:
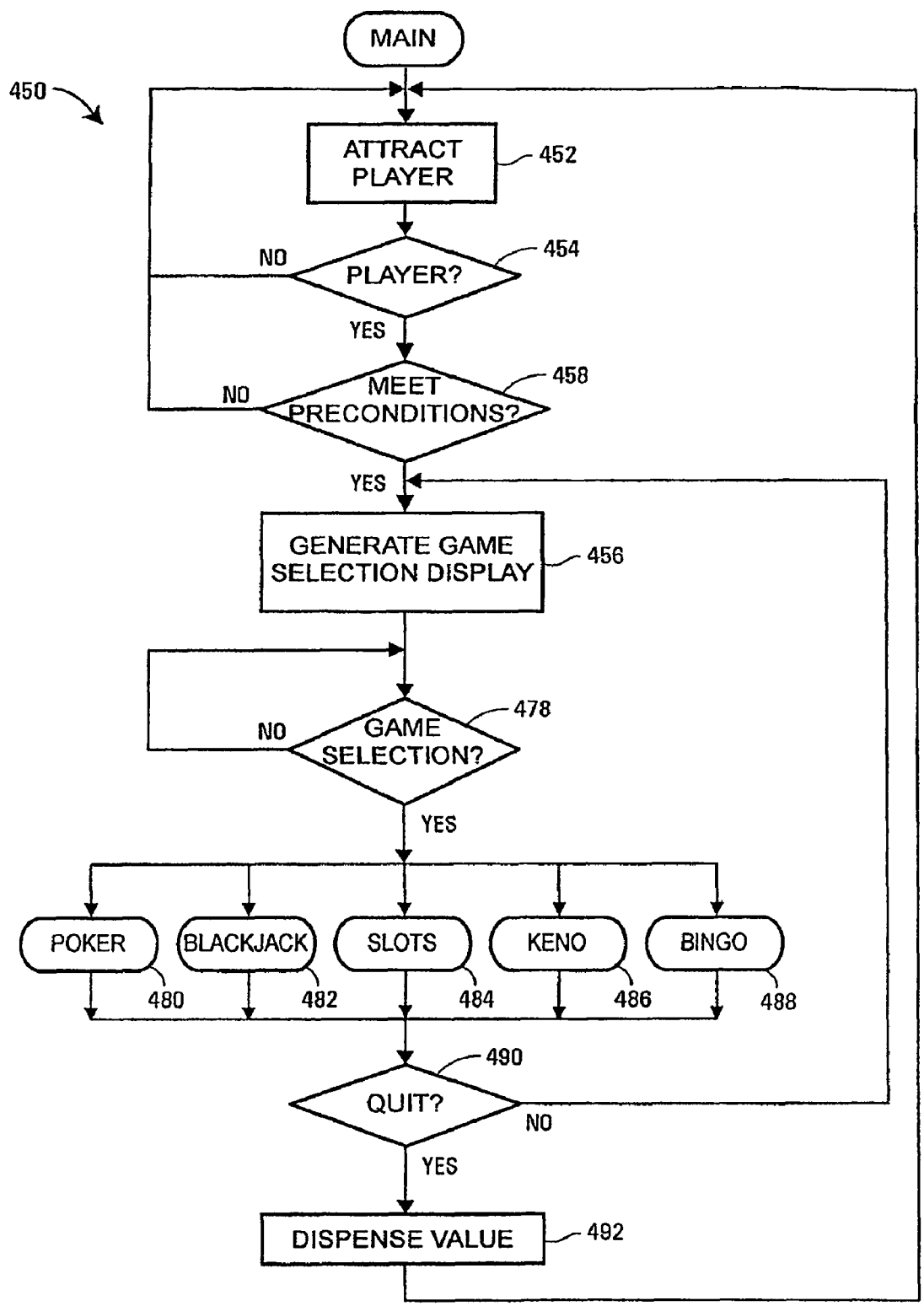
FIG. 9 is a flowchart of an embodiment of a main gaming routine that may be performed during operation of one or more of the gaming units.

FIG. 9 is a flowchart of a gaming main operating routine 450 that may be stored in the memory of the controller 310. Referring to FIG. 9, the main routine 450 may begin operation at block 452 during which an attraction sequence may be performed in an attempt to induce a potential player in a casino to play the gaming unit 54. The attraction sequence may be performed by displaying one or more video images on the display unit 274 (if provided as a video display unit) and/or causing one or more sound segments or sound effects, such as voice or music, to be generated via the speakers 270. The attraction sequence may include a scrolling list of games that may be played on the gaming unit 54 and/or video images of various games being played, such as video poker, video blackjack, video slots, video keno, video bingo, etc.

During performance of the attraction sequence, if a potential player makes any input to the gaming unit 54 as determined at block 454, the attraction sequence may be terminated. The gaming unit 54 may detect an input at block 454 in various ways. For example, the gaming unit 54 could detect if the player presses any button on the gaming unit 54; the gaming unit 54 could determine if the player deposited one or more coins into the gaming unit 54; the gaming unit 54 could determine if player deposited paper currency into the gaming unit; etc.

After terminating the attraction sequence, the routine 450 may proceed to a block 456, and a game selection display may be generated on the display unit 274 (if provided as a video display unit) to allow the player to select a game available on the gaming unit 54. However, according to certain embodiments of the system 50, the gaming units may be provided at locations remote from the place of business of the operator of the system 50 (for example, as illustrated by the gaming unit 188 in FIG. 1A, which gaming unit is coupled to the remainder of the system 50 via the network 150). In such a situation, it may be necessary to ensure that certain preconditions are met before the player is permitted to place a wager and play a game. A block 458 is shown in FIG. 9, and represents a determination as to whether a player has met the preconditions for placing a wager and playing a game. The determination represented by the block 458 in FIG. 9 may be discussed in greater detail with reference to verification routine 460 in FIG. 10.

Figure 10:
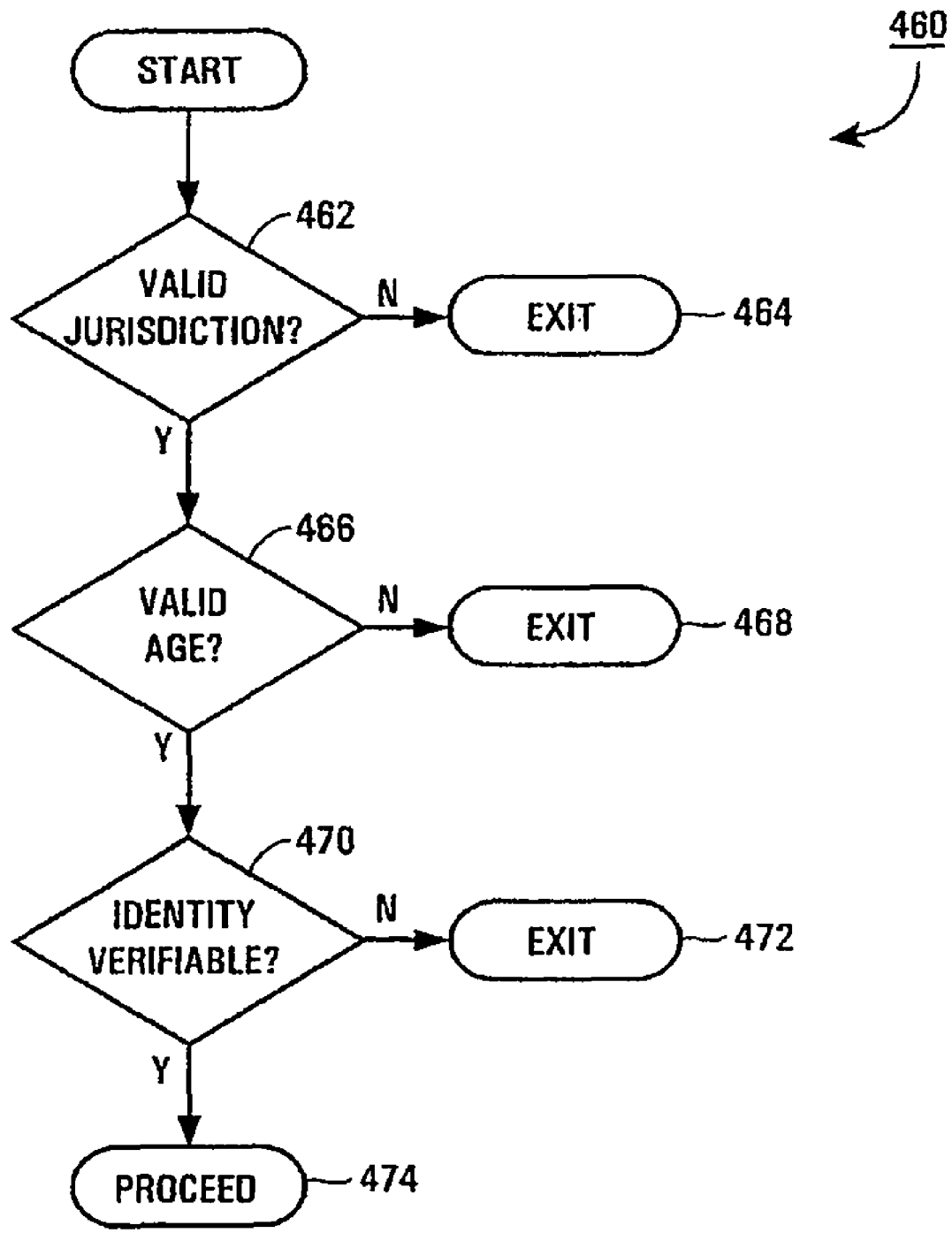
FIG. 10 is a flowchart of an embodiment of a verification routine that may be performed during the operation of the main gaming routine of FIG. 9.

According to FIG. 10, the verification routine 460 begins at a block 462, wherein a determination may be made at to whether the gaming unit (e.g., gaming unit 188) is located in a jurisdiction that permits gaming. This determination may be made by referring to the same types of information as was discussed above with reference to the block 362 of the routine 360 shown in FIG. 5. If the determination is made that the gaming unit is not located in a jurisdiction that permits gaming, the routine exits at a block 464, and the routine 450 returns to the block 452; otherwise, routine passes to a block 466.

At the block 466, a determination may be made as to whether the player meets minimum age requirements (set by state gaming agencies, for example) necessary to operate the gaming unit. For example, a registration event at the gaming system operator's place of business, the player may provide proof of age and identity. The data may then be stored in a memory, such as a server operating as a database at the gaming system operator's place of business or a more portable memory device, such as a memory card or a PDA. The age data may be accessed later to prove age qualification by matching (within established standards) the identity data stored with the age data. If the determination is made and the player fails to age qualify, then the routine 460 may exit at block 468, and the routine 450 returns to the block 452; if the player age qualifies or the determination is omitted, then the routine proceeds to block 470.

At the block 470, a determination may be made as to whether the identify of the player can be verified. The determination of block 470 may be omitted where the gaming system operator can limit access by underage players to the gaming units (for example, in a casino-type gaming environment as opposed to an Internet-type gaming environment). However, the system operator may require that the player provide a form of identification (such as a fingerprint or other form of biometric data, driver's license, or national identity card) that the gaming system operator may use to access age data established by a third party (for example, the state department of motor vehicles). As an alternative, a camera associated with the gaming unit may be used to monitor the player using the gaming unit to verify identity. If the player fails to provide or is unwilling to provide proper verification of identify, the routine 470 exists at a block 472 and the routine 450 returns to the block 452; alternatively, the routine 460 passes to a block 474, and the routine 450 passes to the block 456.

The game selection display generated at block 456 may include, for example, a list of video games that may be played on the gaming unit 54 and/or a visual message to prompt the player to deposit value into the gaming unit 54. While the game-selection display is generated, the gaming unit 54 may wait for the player to make a game selection. Upon selection of one of the games by the player as determined at block 478, the controller 310 may cause one of a number of game routines to be performed to allow the selected game to be played. For example, the game routines could include a video poker routine 480, a video blackjack routine 482, a slots routine 484, a video keno routine 486, and a video bingo routine 488. At block 478, if no game selection is made within a given period of time, the operation may branch back to block 352.

After one of the routines 480, 482, 484, 486, 488 has been performed to allow the player to play one of the games, block 490 may be utilized to determine whether the player wishes to terminate play on the gaming unit 54 or to select another game. If the player wishes to stop playing the gaming unit 54, which wish may be expressed, for example, by selecting a "Cash Out" button, the controller 310 may dispense value to the player at block 492 based on the outcome of the game(s) played by the player. The operation may then return to block 452. If the player did not wish to quit as determined at block 490, the routine may return to block 456 where the game-selection display may again be generated to allow the player to select another game.

It should be noted that although five gaming routines are shown in FIG. 9, a different number of routines could be included to allow play of a different number of games. The gaming unit 54 may also be programmed to allow play of different games.

Figure 11:
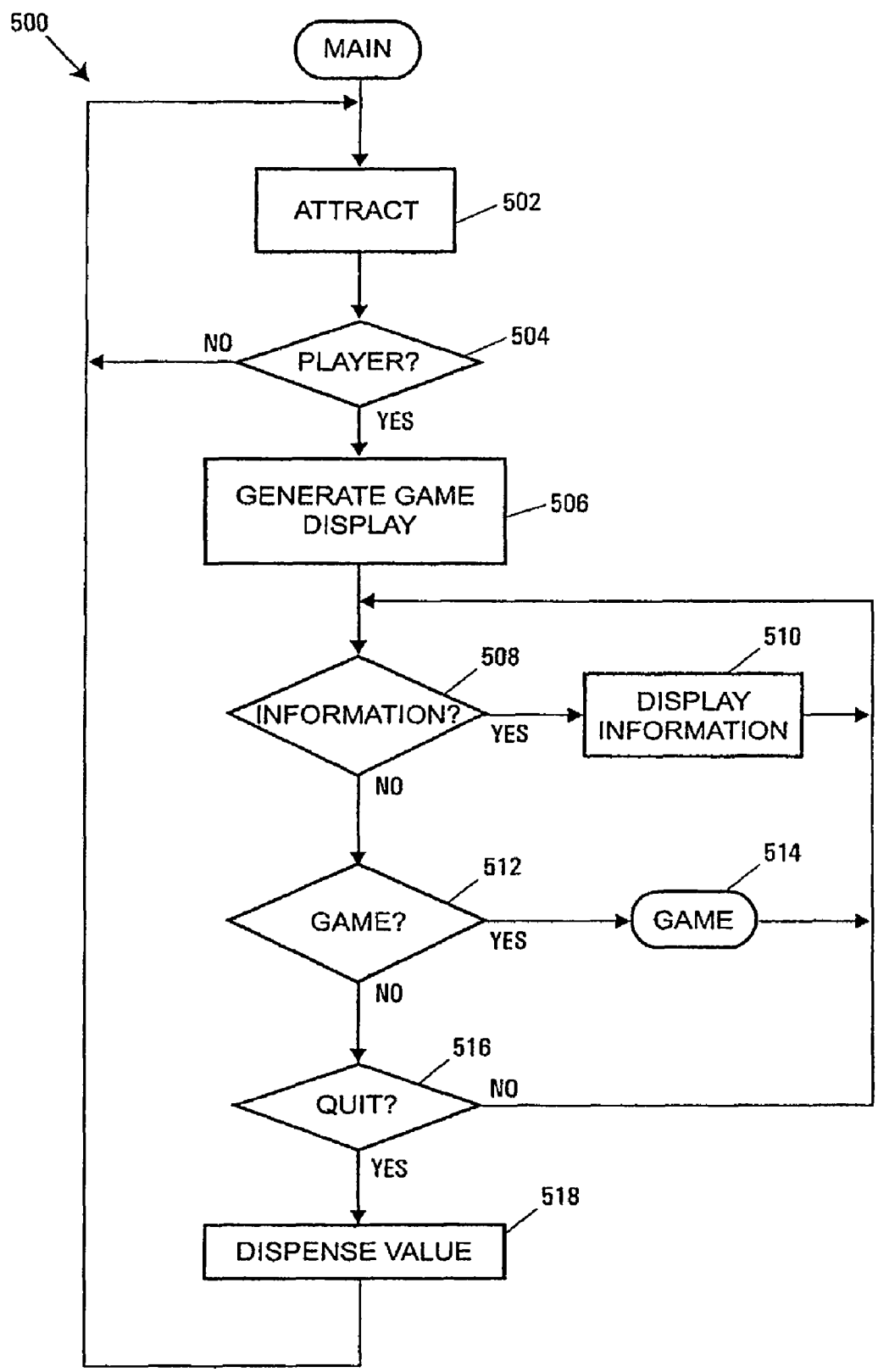
FIG. 11 is a flowchart of an alternative embodiment of a main gaming routine that may be performed during operation of one or more of the gaming units.

FIG. 11 is a flowchart of an alternative main operating routine 500 that may be stored in the memory of the controller 310. The main routine 500 may be utilized for gaming units 54 that are designed to allow play of only a single game or single type of game, and does not include the preconditions block shown in the routine of FIG. 9, although the routine of FIG. 11 may be altered to include such block. Referring to FIG. 11, the main routine 500 may begin operation at block 502 during which an attraction sequence may be performed in an attempt to induce a potential player in a casino to play the gaming unit 54. The attraction sequence may be performed by displaying one or more video images on the display unit 274 (if provided as a video display unit) and/or causing one or more sound segments, such as voice or music, to be generated via the speakers 270.

During performance of the attraction sequence, if a potential player makes any input to the gaming unit 54 as determined at block 504, the attraction sequence may be terminated and a game display may be generated on the display unit 274 (if provided as a video display unit) at block 506. The game display generated at block 506 may include, for example, an image of the casino game that may be played on the gaming unit 54 and/or a visual message to prompt the player to deposit value into the gaming unit 54. At block 508, the gaming unit 54 may determine if the player requested information concerning the game, in which case the requested information may be displayed at block 510. Block 512 may be used to determine if the player requested initiation of a game, in which case a game routine 514 may be performed. The game routine 514 could be any one of the game routines disclosed herein, such as one of the five game routines 480, 482, 484, 486, 488, or another game routine.

After the routine 514 has been performed to allow the player to play the game, block 516 may be utilized to determine whether the player wishes to terminate play on the gaming unit 54. If the player wishes to stop playing the gaming unit 54, which wish may be expressed, for example, by selecting a "Cash Out" button, the controller 310 may dispense value to the player at block 518 based on the outcome of the game(s) played by the player. The operation may then return to block 502. If the player did not wish to quit as determined at block 516, the operation may return to block 508.

Figure 12:
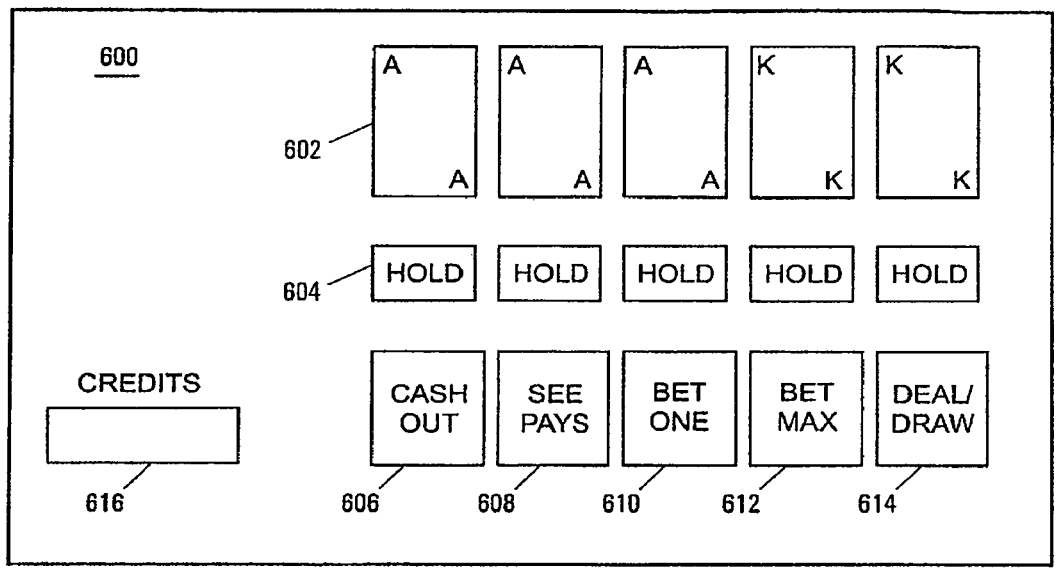
FIG. 12 is an illustration of an embodiment of a visual display that may be displayed during performance of the video poker routine of FIG. 14.

Video Poker

Where the gaming unit 54 is designed to facilitate play of a video poker game, the display unit 274 may comprise a video display unit. FIG. 12 is an exemplary display 600 that may be shown on the display unit 274 during performance of the video poker routine 480 shown schematically in FIG. 9. Referring to FIG. 12, the display 600 may include video images 602 of a plurality of playing cards representing the player's hand, such as five cards. To allow the player to control the play of the video poker game, a plurality of player-selectable buttons may be displayed. The buttons may include a "Hold" button 604 disposed directly below each of the playing card images 602, a "Cash Out" button 606, a "See Pays" button 608, a "Bet One Credit" button 610, a "Bet Max Credits" button 612, and a "Deal/Draw" button 614. The display 600 may also include an area 616 in which the number of remaining credits or value is displayed. If the display unit 274 is provided with a touch-sensitive screen, the buttons 604, 606, 608, 610, 612, 614 may form part of the video display 600. Alternatively, one or more of those buttons may be provided as part of a control panel that is provided separately from the display unit 274.

Figure 14:
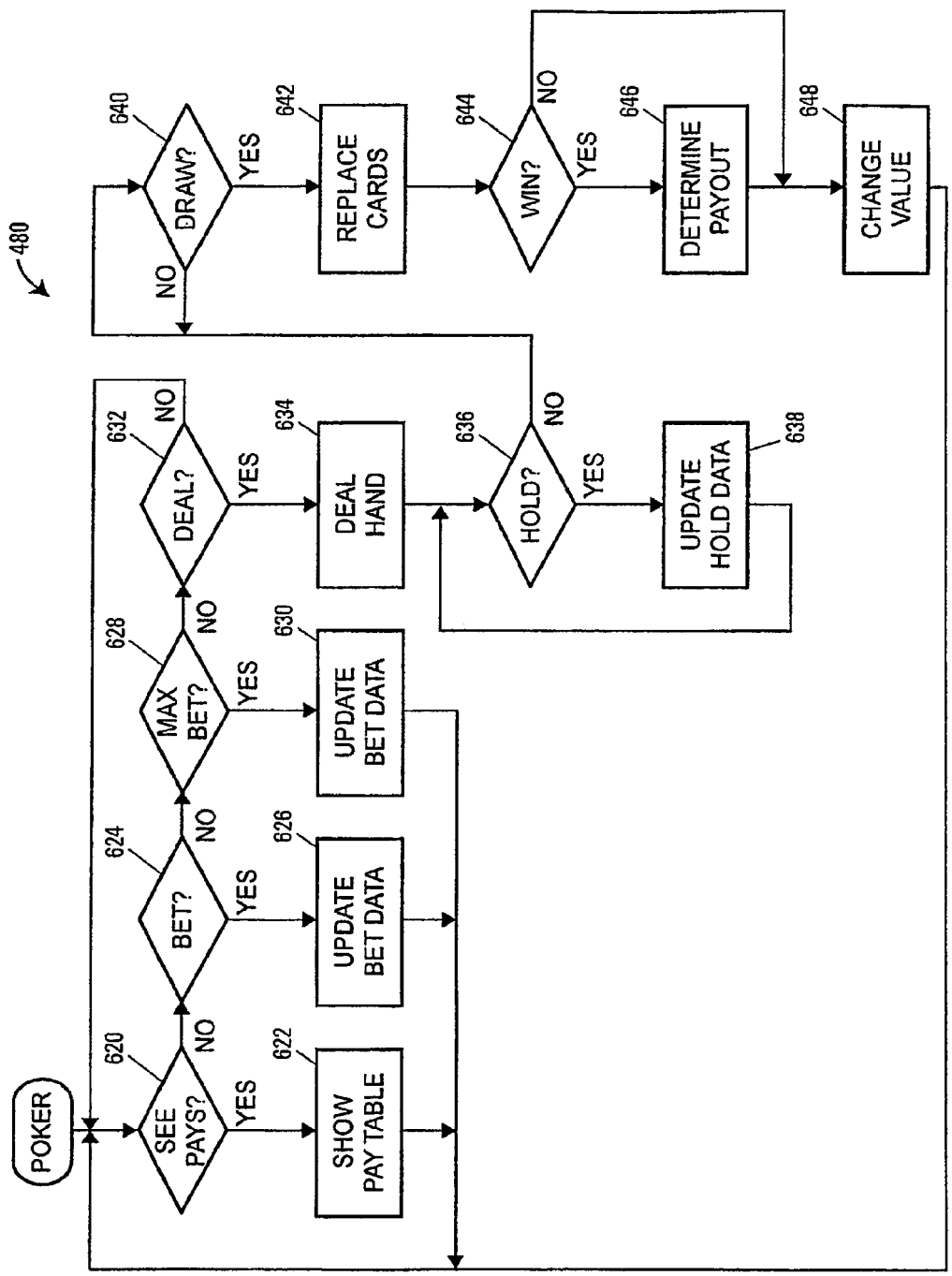
FIG. 14 is a flowchart of an embodiment of a video poker routine that may be performed by one or more of the gaming units.

FIG. 14 is a flowchart of the video poker routine 360 shown schematically in FIG. 9. Referring to FIG. 14, at block 620, the routine may determine whether the player has requested payout information, such as by activating the "See Pays" button 608, in which case at block 622 the routine may cause one or more pay tables to be displayed on the display unit 274. At block 624, the routine may determine whether the player has made a bet, such as by pressing the "Bet One Credit" button 610, in which case at block 626 bet data corresponding to the bet made by the player may be stored in the memory of the controller 310. At block 628, the routine may determine whether the player has pressed the "Bet Max Credits" button 612, in which case at block 630 bet data corresponding to the maximum allowable bet may be stored in the memory of the controller 310.

At block 632, the routine may determine if the player desires a new hand to be dealt, which may be determined by detecting if the "Deal/Draw" button 614 was activated after a wager was made. In that case, at block 634 a video poker hand may be "dealt" by causing the display unit 274 to generate the playing card images 602. After the hand is dealt, at block 636 the routine may determine if any of the "Hold" buttons 604 have been activated by the player, in which case data regarding which of the playing card images 602 are to be "held" may be stored in the controller 310 at block 638. If the "Deal/Draw" button 614 is activated again as determined at block 640, each of the playing card images 602 that was not "held" may be caused to disappear from the video display 600 and to be replaced by a new, randomly selected, playing card image 602 at block 642.

At block 644, the routine may determine whether the poker hand represented by the playing card images 602 currently displayed is a winner. That determination may be made by comparing data representing the currently displayed poker hand with data representing all possible winning hands, which may be stored in the memory of the controller 310. If there is a winning hand, a payout value corresponding to the winning hand may be determined at block 646. At block 648, the player's cumulative value or number of credits may be updated by subtracting the bet made by the player and adding, if the hand was a winner, the payout value determined at block 646. The cumulative value or number of credits may also be displayed in the display area 616 (FIG. 12).

Although the video poker routine 480 is described above in connection with a single poker hand of five cards, the routine 480 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Figure 13:
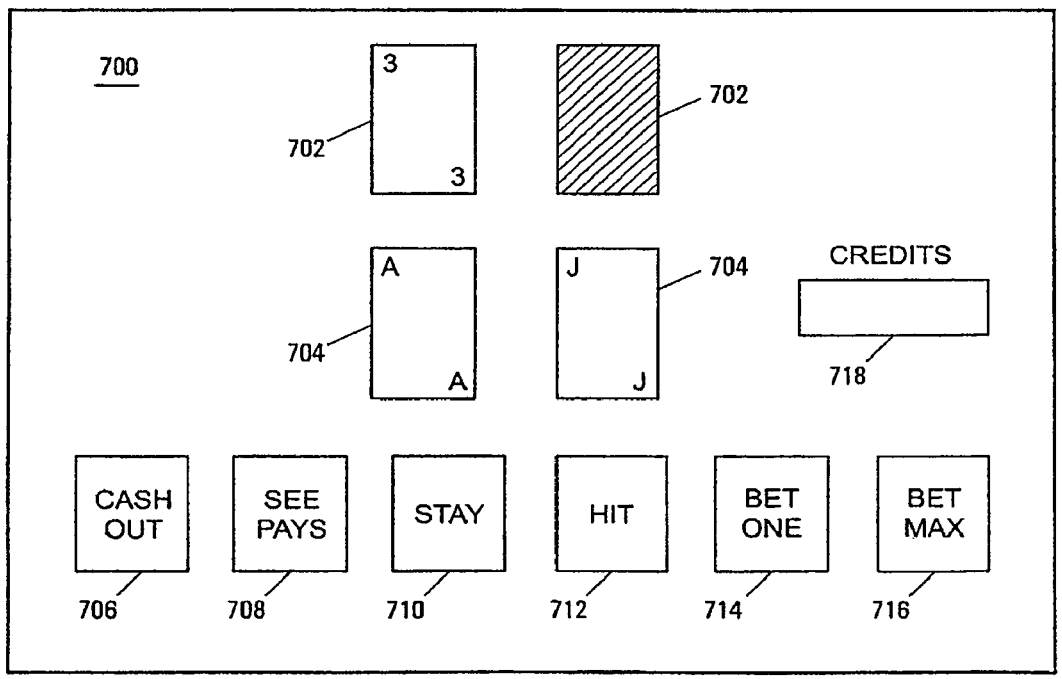
FIG. 13 is an illustration of an embodiment of a visual display that may be displayed during performance of the video blackjack routine of FIG. 15.

Video Blackjack

Where the gaming unit 54 is designed to facilitate play of a video blackjack game, the display unit 274 may comprise a video display unit. FIG. 13 is an exemplary display 700 that may be shown on the display unit 274 during performance of the video blackjack routine 482 shown schematically in FIG. 9. Referring to FIG. 13, the display 700 may include video images 702 of a pair of playing cards representing a dealer's hand, with one of the cards shown face up and the other card being shown face down, and video images 704 of a pair of playing cards representing a player's hand, with both the cards shown face up. The "dealer" may be the gaming unit 54.

To allow the player to control the play of the video blackjack game, a plurality of player-selectable buttons may be displayed. The buttons may include a "Cash Out" button 706, a "See Pays" button 708, a "Stay" button 710, a "Hit" button 712, a "Bet One Credit" button 714, and a "Bet Max Credits" button 716. The display 700 may also include an area 718 in which the number of remaining credits or value is displayed. If the display unit 274 is provided with a touch-sensitive screen, the buttons 706, 708, 710, 712, 714, 716 may form part of the video display 700. Alternatively, one or more of those buttons may be provided as part of a control panel that is provided separately from the display unit 274.

Figure 15:
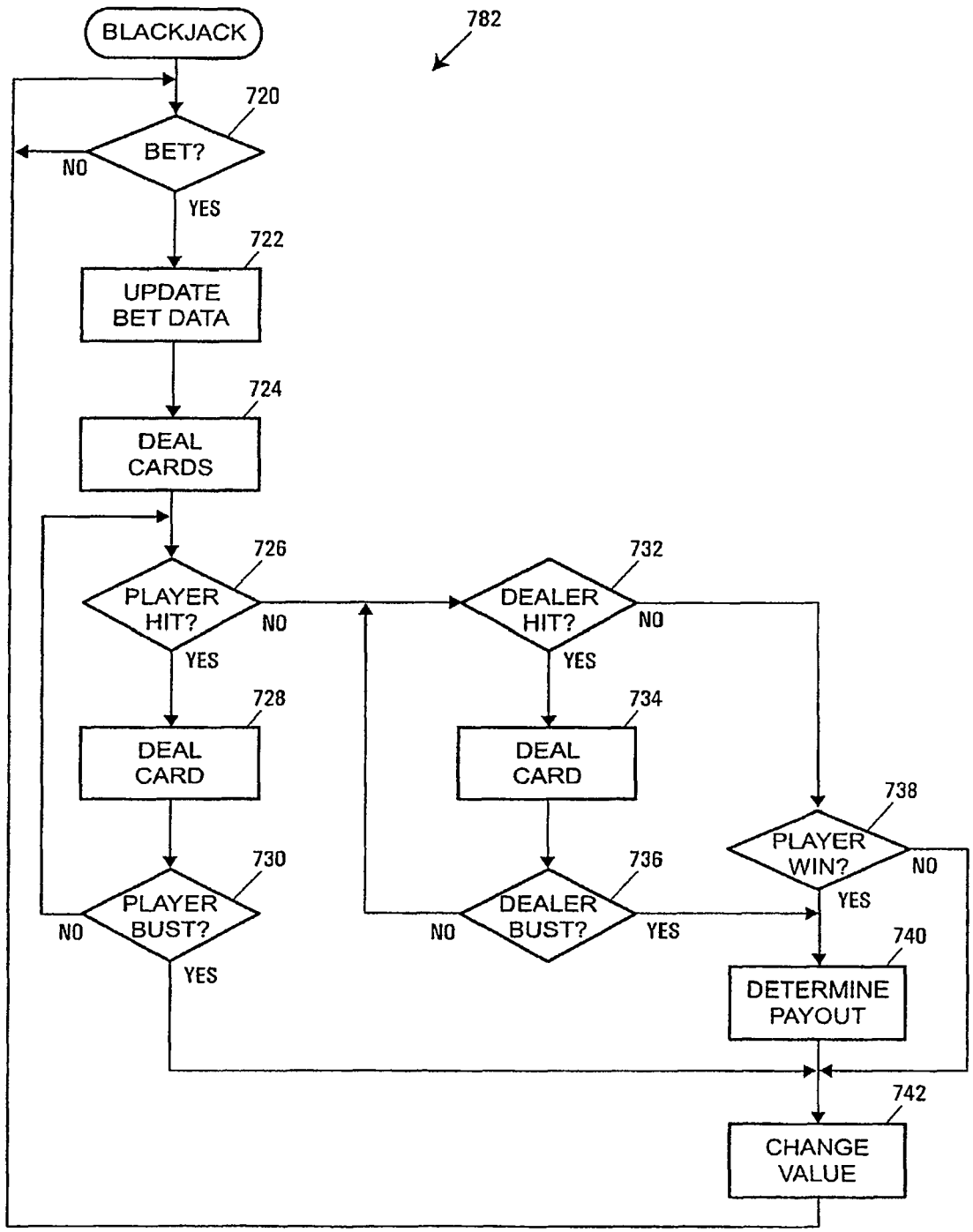
FIG. 15 is a flowchart of an embodiment of a video blackjack routine that may be performed by one or more of the gaming units.

FIG. 15 is a flowchart of the video blackjack routine 482 shown schematically in FIG. 9. Referring to FIG. 15, the video blackjack routine 482 may begin at block 720 where it may determine whether a bet has been made by the player. That may be determined, for example, by detecting the activation of either the "Bet One Credit" button 714 or the "Bet Max Credits" button 716. At block 722, bet data corresponding to the bet made at block 720 may be stored in the memory of the controller 310. At block 724, a dealer's hand and a player's hand may be "dealt" by making the playing card images 702, 704 appear on the display unit 274.

At block 726, the player may be allowed to be "hit," in which case at block 728 another card will be dealt to the player's hand by making another playing card image 704 appear in the display 700. If the player is hit, block 730 may determine if the player has "bust," or exceeded 21. If the player has not bust, blocks 726 and 728 may be performed again to allow the player to be hit again.

If the player decides not to hit, at block 732 the routine may determine whether the dealer should be hit. Whether the dealer hits may be determined in accordance with predetermined rules, such as the dealer always hit if the dealer's hand totals 15 or less. If the dealer hits, at block 734 the dealer's hand may be dealt another card by making another playing card image 702 appear in the display 700. At block 736 the routine may determine whether the dealer has bust. If the dealer has not bust, blocks 732, 734 may be performed again to allow the dealer to be hit again.

If the dealer does not hit, the outcome of the blackjack game and a corresponding payout may be determined based on, for example, whether the player or the dealer has the higher hand that does not exceed 21, as determined at block 738. If the player has a winning hand, a payout value corresponding to the winning hand may be determined at block 740. At block 742, the player's cumulative value or number of credits may be updated by subtracting the bet made by the player and adding, if the player won, the payout value determined at block 740. The cumulative value or number of credits may also be displayed in the display area 718 (FIG. 13).

Figure 16:
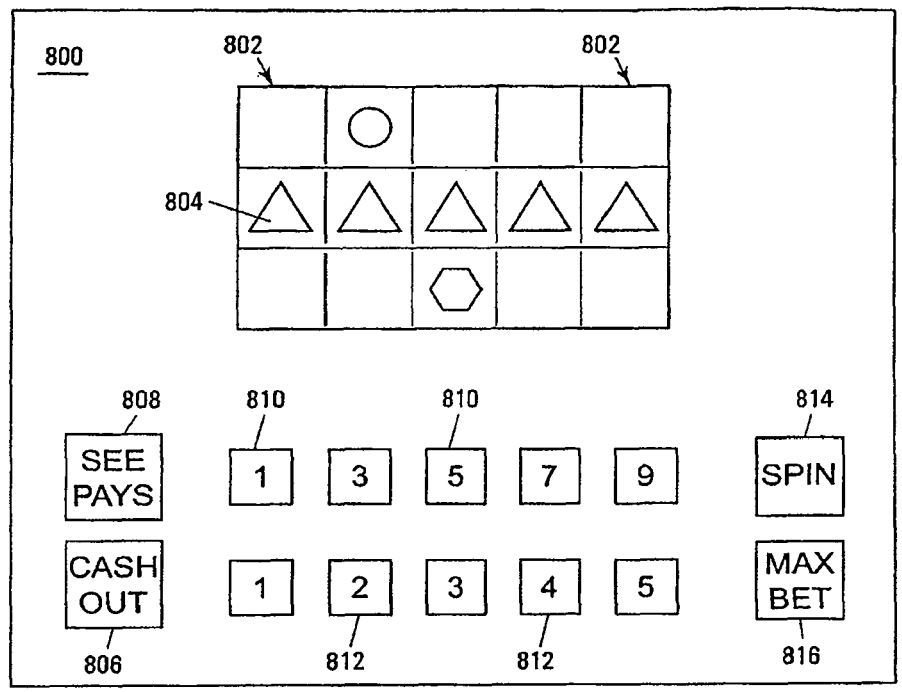
FIG. 16 is an illustration of an embodiment of a visual display that may be displayed during performance of the slots routine of FIG. 18.

Slots

Where the gaming unit 54 is designed to facilitate play of a video slots game, the display unit 274 may comprise a video display unit. FIG. 16 is an exemplary display 800 that may be shown on the display unit 274 during performance of the slots routine 484 shown schematically in FIG. 9. Referring to FIG. 16, the display 800 may include video images 802 of a plurality of slot machine reels, each of the reels having a plurality of reel symbols 804 associated therewith. Although the display 800 shows five reel images 802, each of which may have three reel symbols 804 that are visible at a time, other reel configurations could be utilized.

To allow the player to control the play of the slots game, a plurality of player-selectable buttons may be displayed. The buttons may include a "Cash Out" button 806, a "See Pays" button 808, a plurality of payline-selection buttons 810 each of which allows the player to select a different number of paylines prior to "spinning" the reels, a plurality of bet-selection buttons 812 each of which allows a player to specify a wager amount for each payline selected, a "Spin" button 814, and a "Max Bet" button 816 to allow a player to make the maximum wager allowable.

Figure 18:
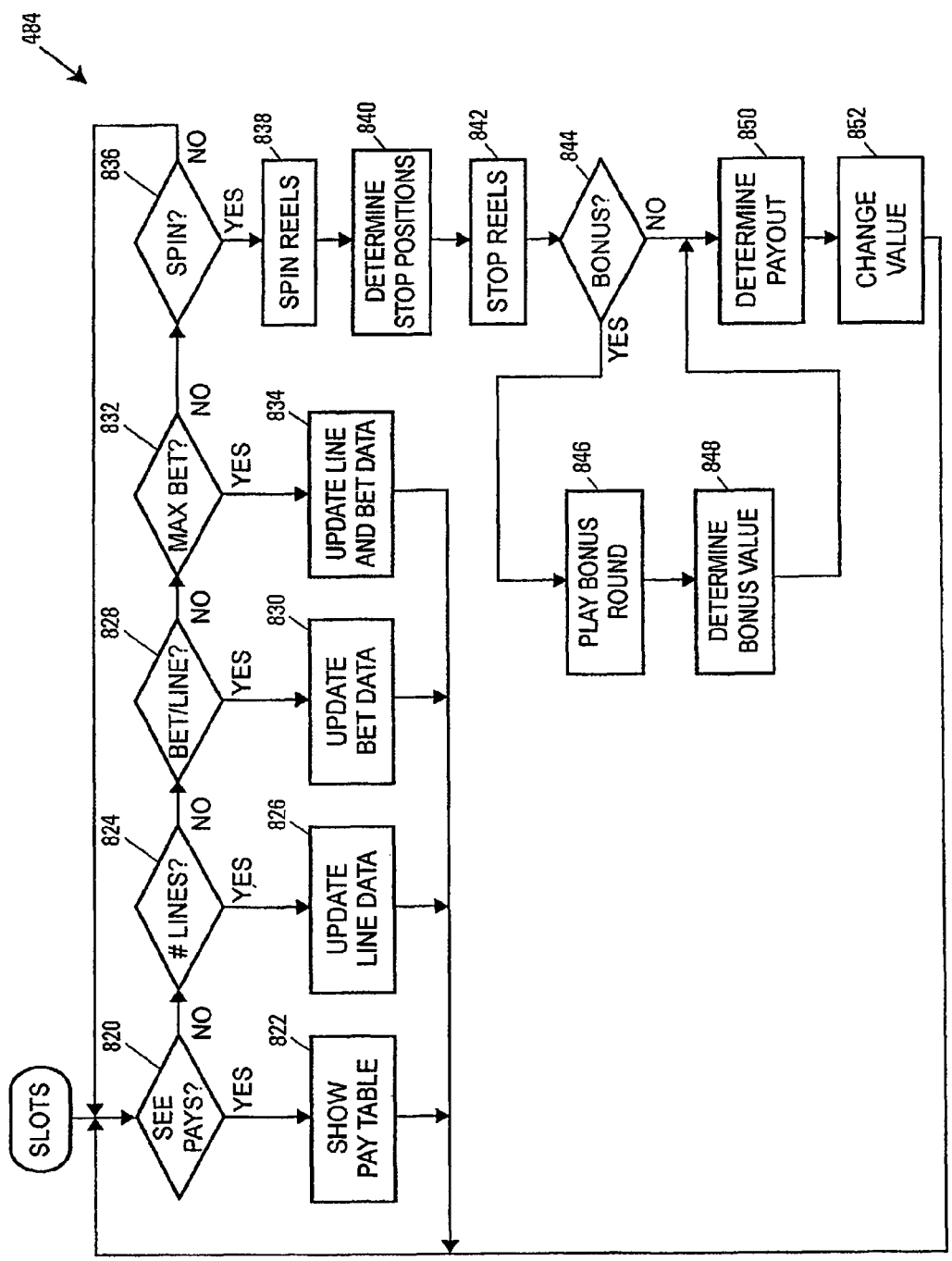
FIG. 18 is a flowchart of an embodiment of a slots routine that may be performed by one or more of the gaming units.

FIG. 18 is a flowchart of the slots routine 484 shown schematically in FIG. 9. Referring to FIG. 18, at block 820, the routine may determine whether the player has requested payout information, such as by activating the "See Pays" button 808, in which case at block 822 the routine may cause one or more pay tables to be displayed on the display unit 274. At block 824, the routine may determine whether the player has pressed one of the payline-selection buttons 810, in which case at block 826 data corresponding to the number of paylines selected by the player may be stored in the memory of the controller 310. At block 828, the routine may determine whether the player has pressed one of the bet-selection buttons 812, in which case at block 830 data corresponding to the amount bet per payline may be stored in the memory of the controller 310. At block 832, the routine may determine whether the player has pressed the "Max Bet" button 816, in which case at block 834 bet data (which may include both payline data and bet-per-payline data) corresponding to the maximum allowable bet may be stored in the memory of the controller 310.

If the "Spin" button 814 has been activated by the player as determined at block 836, at block 838 the routine may cause the slot machine reel images 802 to begin "spinning" so as to simulate the appearance of a plurality of spinning mechanical slot machine reels. At block 840, the routine may determine the positions at which the slot machine reel images will stop, or the particular symbol images 804 that will be displayed when the reel images 802 stop spinning. At block 842, the routine may stop the reel images 802 from spinning by displaying stationary reel images 802 and images of three symbols 804 for each stopped reel image 802. The reels may be stopped from left to right, from the perspective of the player, or in any other manner or sequence.

The routine may provide for the possibility of a bonus game or round if certain conditions are met, such as the display in the stopped reel images 802 of a particular symbol 804. If there is such a bonus condition as determined at block 844, the routine may proceed to block 846 where a bonus round may be played. The bonus round may be a different game than slots, and many other types of bonus games could be provided. If the player wins the bonus round, or receives additional credits or points in the bonus round, a bonus value may be determined at block 848. A payout value corresponding to outcome of the slots game and/or the bonus round may be determined at block 850. At block 852, the player's cumulative value or number of credits may be updated by subtracting the bet made by the player and adding, if the slot game and/or bonus round was a winner, the payout value determined at block 850.

Although the above routine has been described as a video slot machine routine in which slot machine reels are represented as images on the display unit 274, actual slot machine reels that are capable of being spun may be utilized instead, in which case the display unit 274 could be provided in the form of a plurality of mechanical reels that are rotatable, each of the reels having a plurality of reel images disposed thereon.

Moreover, it will be recognized that the determination of whether the player should receive a payout corresponding to the outcome of the slots game, an opportunity to play the bonus game, and/or receive a payout corresponding to the outcome of the bonus game may be made before the reels start "spinning." That is, the outcome of the slots game may be determined shortly after the wager is made and the "Spin" button 814 is depressed, with the animation of the reels (whether mechanical, electro-mechanical, or electrical) being selected according to the outcome to signal the player that a particular outcome has been determined. Likewise, the determination of whether the outcome will provide the opportunity of a bonus game may be made before the animation of the reels, and the outcome of the bonus game before the bonus game is displayed. As a consequence, the order of the determination of the outcome of the slots game or bonus game and the animation of the reels need not be in the order shown in FIG. 18, and, in fact, may be in a different order without departing from the spirit and teaching of this disclosure. Similar remarks may be made in regard to the determinations of the outcomes and animations of the poker and blackjack routines discussed above, and the outcomes and animations of the keno and bingo routines discussed below.

Figure 17:
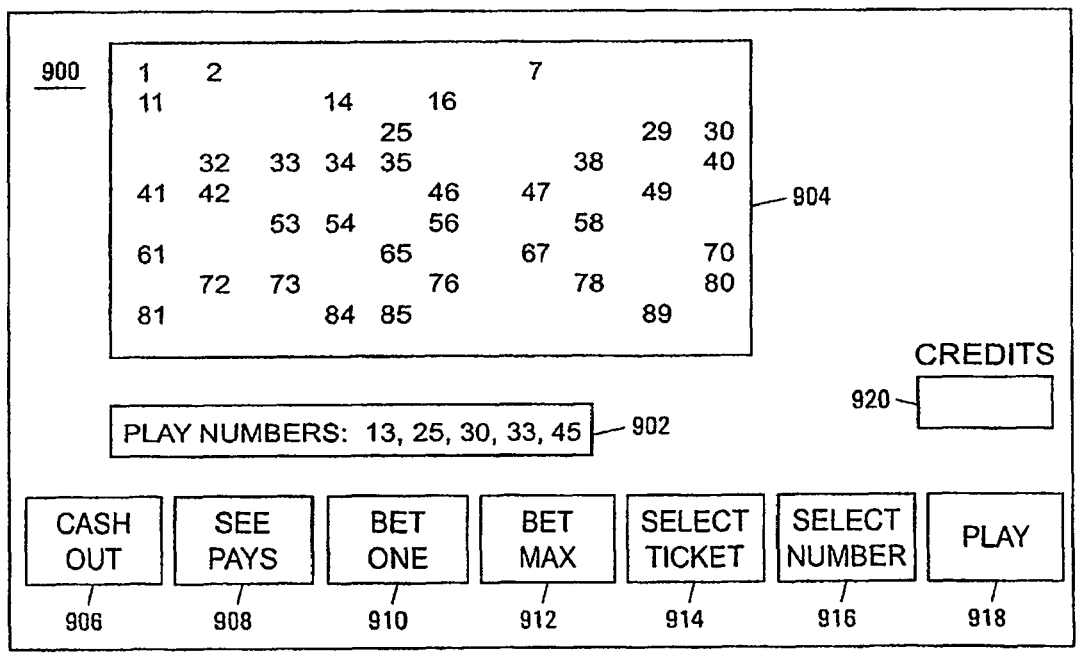
FIG. 17 is an illustration of an embodiment of a visual display that may be displayed during performance of the video keno routine of FIG. 19.

Video Keno

Where the gaming unit 54 is designed to facilitate play of a video keno game, the display unit 274 may comprise a video display unit. FIG. 17 is an exemplary display 900 that may be shown on the display unit 274 during performance of the video keno routine 486 shown schematically in FIG. 9. Referring to FIG. 17, the display 900 may include a video image 902 of a plurality of numbers that were selected by the player prior to the start of a keno game and a video image 904 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 906, a "See Pays" button 908, a "Bet One Credit" button 910, a "Bet Max Credits" button 912, a "Select Ticket" button 914, a "Select Number" button 916, and a "Play" button 918. The display 900 may also include an area 920 in which the number of remaining credits or value is displayed. If the display unit 274 is provided with a touch-sensitive screen, the buttons may form part of the video display 900. Alternatively, one or more of those buttons may be provided as part of a control panel that is provided separately from the display unit 274.

Figure 19:
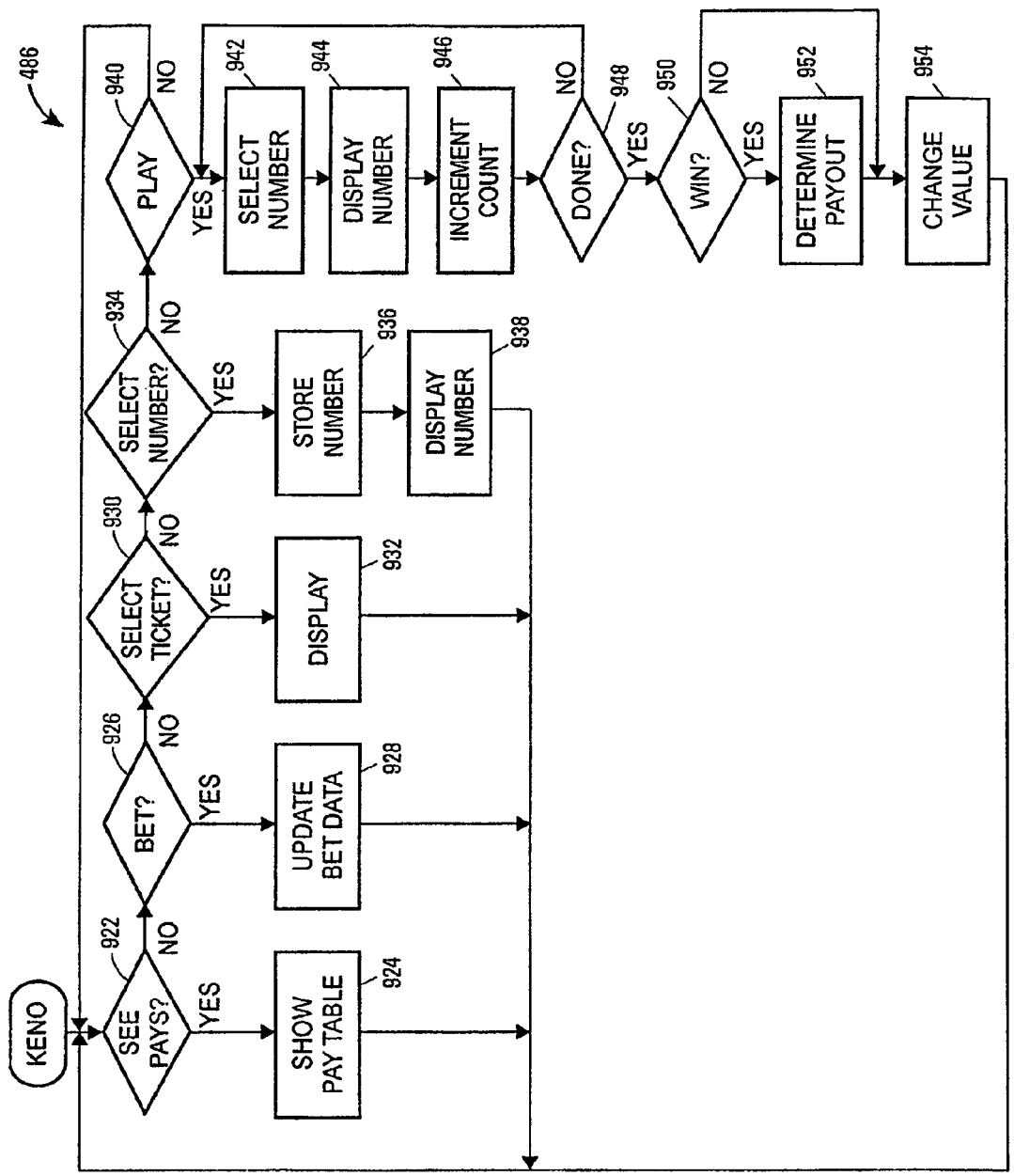
FIG. 19 is a flowchart of an embodiment of a video keno routine that may be performed by one or more of the gaming units.

FIG. 19 is a flowchart of the video keno routine 486 shown schematically in FIG. 9. The keno routine 486 may be utilized in connection with a single gaming unit 54 where a single player is playing a keno game, or the keno routine 486 may be utilized in connection with multiple gaming units 54 where multiple players are playing a single keno game. In the latter case, one or more of the acts described below may be performed either by the controller 310 in each gaming unit or by one of the network computers 56, 76, 110, 112 to which multiple gaming units 54 are operatively connected.

Referring to FIG. 19, at block 922, the routine may determine whether the player has requested payout information, such as by activating the "See Pays" button 908, in which case at block 924 the routine may cause one or more pay tables to be displayed on the display unit 274. At block 926, the routine may determine whether the player has made a bet, such as by having pressed the "Bet One Credit" button 910 or the "Bet Max Credits" button 912, in which case at block 928 bet data corresponding to the bet made by the player may be stored in the memory of the controller 310. After the player has made a wager, at block 930 the player may select a keno ticket, and at block 932 the ticket may be displayed on the display 900. At block 934, the player may select one or more game numbers, which may be within a range set by the casino. After being selected, the player's game numbers may be stored in the memory of the controller 310 at block 936 and may be included in the image 902 on the display 900 at block 938. After a certain amount of time, the keno game may be closed to additional players (where a number of players are playing a single keno game using multiple gambling units 54).

If play of the keno game is to begin as determined at block 940, at block 942 a game number within a range set by the casino may be randomly selected either by the controller 310 or a central computer operatively connected to the controller, such as one of the network computers 56, 76, 110, 112. At block 944, the randomly selected game number may be displayed on the display unit 274 and the display units 274 of other gaming units 54 (if any) which are involved in the same keno game. At block 946, the controller 310 (or the central computer noted above) may increment a count which keeps track of how many game numbers have been selected at block 942.

At block 948, the controller 310 (or one of the network computers 56, 76, 110, 112) may determine whether a maximum number of game numbers within the range have been randomly selected. If not, another game number may be randomly selected at block 942. If the maximum number of game numbers has been selected, at block 950 the controller 310 (or a central computer 56, 76, 110, 112) may determine whether there are a sufficient number of matches between the game numbers selected by the player and the game numbers selected at block 942 to cause the player to win. The number of matches may depend on how many numbers the player selected and the particular keno rules being used.

If there are a sufficient number of matches, a payout may be determined at block 952 to compensate the player for winning the game. The payout may depend on the number of matches between the game numbers selected by the player and the game numbers randomly selected at block 942. At block 954, the player's cumulative value or number of credits may be updated by subtracting the bet made by the player and adding, if the keno game was won, the payout value determined at block 952. The cumulative value or number of credits may also be displayed in the display area 920 (FIG. 17).

Figure 20:
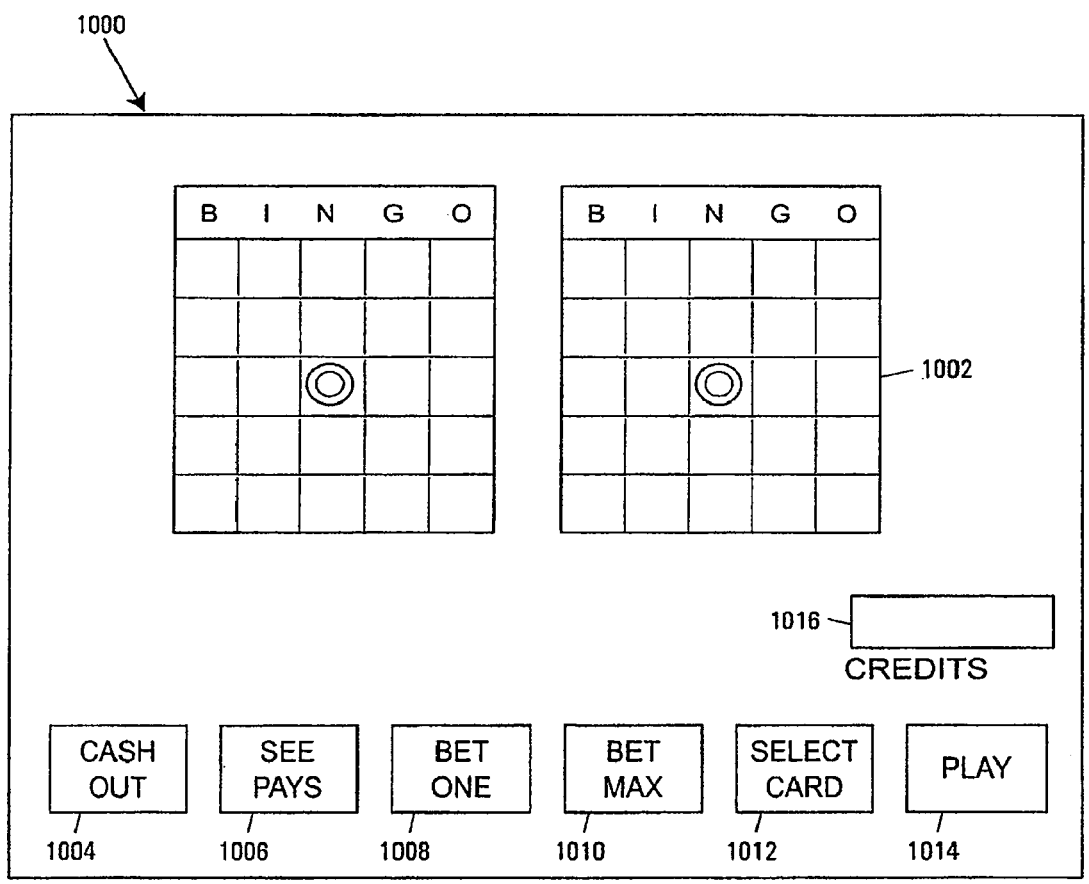
FIG. 20 is an illustration of an embodiment of a visual display that may be displayed during performance of the video bingo routine of FIG. 21.

Video Bingo

Where the gaming unit 54 is designed to facilitate play of a video bingo game, the display unit 274 may comprise a video display unit. FIG. 20 is an exemplary display 1000 that may be shown on the display unit 274 during performance of the video bingo routine 488 shown schematically in FIG. 9. Referring to FIG. 20, the display 1000 may include one or more video images 1002 of a bingo card and images of the bingo numbers selected during the game. The bingo card images 1002 may have a grid pattern.

To allow the player to control the play of the bingo game, a plurality of player-selectable buttons may be displayed. The buttons may include a "Cash Out" button 1004, a "See Pays" button 1006, a "Bet One Credit" button 1008, a "Bet Max Credits" button 11010, a "Select Card" button 1012, and a "Play" button 1014. The display 1000 may also include an area 1016 in which the number of remaining credits or value is displayed. If the display unit 274 is provided with a touch-sensitive screen, the buttons may form part of the video display 1000. Alternatively, one or more of those buttons may be provided as part of a control panel that is provided separately from the display unit 274.

Figure 21:
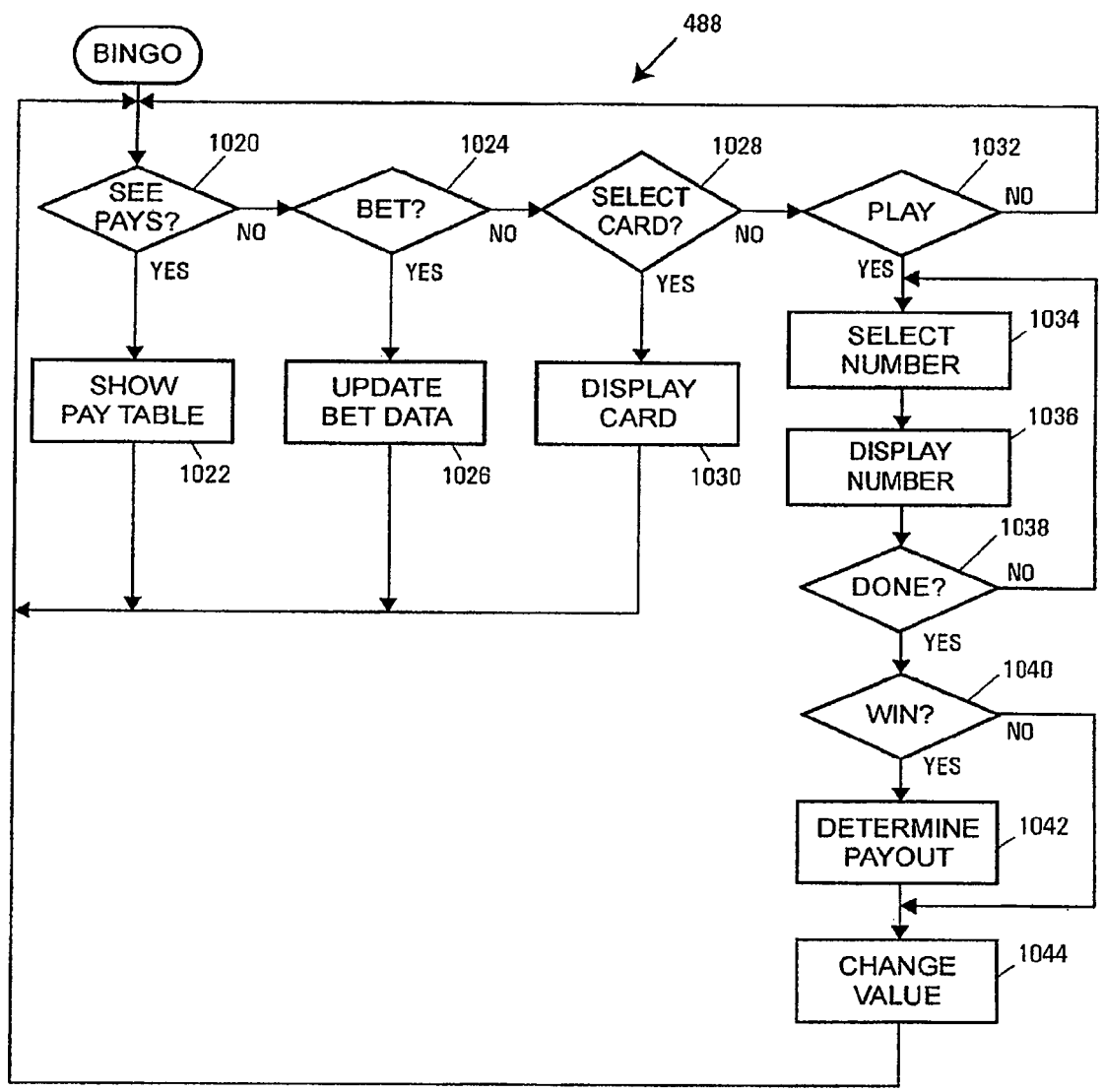
FIG. 21 is a flowchart of an embodiment of a video bingo routine that may be performed by one or more of the gaming units.

FIG. 21 is a flowchart of the video bingo routine 488 shown schematically in FIG. 9. The bingo routine 488 may be utilized in connection with a single gaming unit 54 where a single player is playing a bingo game, or the bingo routine 488 may be utilized in connection with multiple gaming units 54 where multiple players are playing a single bingo game. In the latter case, one or more of the acts described below may be performed either by the controller 310 in each gaming unit 54 or by one of the network computers 56, 76, 110, 112 to which multiple gaming units 54 are operatively connected.

Referring to FIG. 21, at block 1020, the routine may determine whether the player has requested payout information, such as by activating the "See Pays" button 1006, in which case at block 1022 the routine may cause one or more pay tables to be displayed on the display unit 274. At block 1024, the routine may determine whether the player has made a bet, such as by having pressed the "Bet One Credit" button 1008 or the "Bet Max Credits" button 1010, in which case at block 1026 bet data corresponding to the bet made by the player may be stored in the memory of the controller 310.

After the player has made a wager, at block 1028 the player may select a bingo card, which may be generated randomly. The player may select more than one bingo card, and there may be a maximum number of bingo cards that a player may select. The card or cards may be added to the display 1000 at block 1030. After play is to commence as determined at block 1032, at block 1034 a bingo number may be randomly generated by the controller 310 or a central computer such as one of the network computers 56, 76, 110, 112. At block 1036, the bingo number may be displayed on the display unit 274 and the display units 274 of any other gaming units 54 involved in the bingo game.

At block 1038, the controller 310 (or a central computer) may determine whether any player has won the bingo game. If no player has won, another bingo number may be randomly selected at block 1034. If any player has bingo as determined at block 1038, the routine may determine at block 1040 whether the player playing that gaming unit 54 was the winner. If so, at block 1042 a payout for the player may be determined. The payout may depend on the number of random numbers that were drawn before there was a winner, the total number of winners (if there was more than one player), and the amount of money that was wagered on the game. At block 1044, the player's cumulative value or number of credits may be updated by subtracting the bet made by the player and adding, if the bingo game was won, the payout value determined at block 1042. The cumulative value or number of credits may also be displayed in the display area 1016 (FIG. 20).

Example of Operation of System

The following are examples of the operation of the brand association aspect of the system 50 according to an embodiment of the system 50. The examples are for illustration purposes only, and are not meant to limit the scope of the claims thereby, or to emphasize one embodiment discussed over another.

According to a first example, the brand association routine 350 is operating in the server 140. In this example, the brand association routine 350 utilizes information or data from the player profile and brand criteria, but no event criteria. Consequently, the routine 350 starts at block 352.

At block 352, the determination is made that player profiles will be utilized in determining the selected brand to be used. According to this example, the player profiles are stored in the player tracking server 142, and the brand association server 140 determines which profiles are to be retrieved from the player tracking server 142 according to those players that are signed in to the player tracking system including the player tracking server 142 and at least the gaming units associated with the player tracking modules 176. A player may sign in to the player tracking system by disposing a player tracking card into the card reader 262 associated with the respective player tracking module 260. The player profiles of the players that are signed into the player tracking system are downloaded to the brand association server 140, completing block 354.

For purposes of illustration, the player profiles downloaded may contain a travel record. In particular, the travel record may include information regarding the player's preferences concerning airline travel, hotels accommodations, and rental car companies. According to this example this information will be used in the determination made at block 388.

The routine 350 then passes to block 380, wherein the determination is made that no event criteria will be used in the determination made at block 388. As a consequence, the routine 350 proceeds to block 384.

At block 384, the server 140 determines that brand criteria is to be used, in part, to select the brand or brands according to the present example. The routine then proceeds to block 386, wherein the brand criteria are received by the brand server. According to the present example, the network operator may be looking to provide a prize program for its player tracking club members that includes airline travel, hotel accommodations, and ground transport. As such, the network operator may established a brand criteria which will select those players whose player profiles, and in particular, their travel records, indicate that they have taken a trip recently by airplane, typically take at least one four-day vacation each year, and typically rent a car if they travel by airplane.

At block 388, the determination is made as to which brands to select. In this example, the server 140 first compares the brand criteria with the player profiles to determine the number of players that have travel records that match the brand criteria. Based on the comparison, the server 140 may determine that there are three hundred individuals that meet the brand criteria. The server 140 then sends a request for bids to several airlines, to several hotels, and to several car rental companies, alerting them to the fact that the network operator associated with the server 140 wishes to establish a prize package including first class air travel to Orlando, Fla., four-night accommodation, and a rental car. In exchange, the winning bidder will have their advertisements displayed and their corporate logo included as a symbol on one or more of the game elements displayed. In response to the request for bids, the server 140 may receive several bids from airlines, hotel companies and car rental companies. According to this example, the determination of which brands to feature may be made by selecting the lowest bid for each service (airline travel, hotel accommodation, and car rental).

At block 390, the server 140 retrieves brand materials from each of the winning bidders. According to this example, the server 140 may receive downloads of logos from each of the winning bidders to be used to replace the symbols on one of the gaming units associated with one of the players is part of the selected group of players. The server 140 may also receive advertising materials from the winning bidder/brand-promoters.

In turn, the server 140 may download the logos to the gaming unit download server 144 as part of block 392. The server 140 may also define a modification to the paytable used by the gaming units 180 to include an outcome that will be associated with the prize package, which paytable will be downloaded to the gaming unit download server 144. Preferably, this prize package will be assigned to a combination of symbols that is infrequently displayed and not presently associated with a payout, and that could be composed of one each of the logo of the selected airline brand, the selected hotel brand, and the selected car rental brand. The server 140 may further download the advertising materials to the gaming unit download server 144. The gaming unit download server 144 may then download the logos, the paytable, and the advertising materials to the gaming units 180.

With the logos, paytable and advertising materials downloaded to the gaming units 180, the routine 350 may proceed to block 394. The server 140 or the gaming units 180 may perform a check before using the downloaded brand materials, to determine if the gaming unit 180 is presently executing an iteration of the game routine, which may be a video slots routine. If the determination is made that the gaming unit 180 is presently executing an iteration of the game routine, the substitution of the logos and the paytable may be delayed until the execution of the present iteration is complete, whether that means that the server 140 delays the transmission of a signal that would otherwise cause the gaming unit 180 to use the downloaded logos and paytable or that means that the controller 310 associated with the gaming unit delays implementation. On the other hand, because the advertising material would not affect the operation of the game routine, the gaming unit may begin to display the advertising material as soon as the routine proceeds to block 394. According to this example, the advertising material of each of the winning bidders/brand-promoters may be displayed to the player in sequence, along with an explanation of the prize program that the player is participating in, or the advertising material of all of the winning bidder/brand-promoters may be displayed at the same time, if space permits.

The operation of the gaming units 180 continues in this fashion until one of the player/participants achieves the outcome that is associated with the prize. At that time, the server 140 may determine at block 444 that a new brand may now be displayed on the gaming units 180 other than the gaming unit 180 associated with the winning player. For these other gaming units 180, the routine 350 may return to block 352.

As for the winning player, the outcome may cause the server 140 to retrieve one or more images that are displayed on the display unit 274 of the gaming unit 180. The images may represent one or more forms that are transmitted from the gaming unit 180 to the server 140, and from there to the servers 168, 170, 172, for example. Alternatively, the forms may be downloaded from the servers 168, 170, 172 and returned to the servers 168, 170, 172 when completed. As a further alternative, the images may be associated with an on-line travel agent or travel organizer, which acts as an intermediary between the casino/network operator that administers the handling of the establishment of the competition and the awarding of the prize and the brand-promoters that administer the delivery of the component goods and//or services that make up the prize. As further alternative, the server 140 may control the printer 256 associated with the gaming unit 180, via the controller 310 associated with the gaming unit 180, for example, to provide a plurality of vouchers that may be independently redeemable with each of the brand-promoters for the component parts of the prize package.

According to a second example, the brand association routine 350 is operating in one of the gaming units 75, which also is operating as a video slots game, such as is shown in FIG. 6A. In this example, the brand association routine 350 does not rely on the player profile data, event criteria or brand criteria to determine the selected brand. Consequently, the brand association routine 350 begins with the determination of the brand at block 388.

The determination of the brand at block 388 may be made according to an input received from the player. In particular, a ticket or coupon may be fed into the ticket reader 256. According to the data printed on the ticket or coupon, which may have been given to the player as part of a promotional event for the casino or a promotional event for a brand-promoter, such as in combination with the purchase of a good and/or service from the brand-promoter, the controller 310 of the gaming unit 75 may determine which brand is to be selected.

At block 390, the controller 310 may retrieve brand materials that have been stored in advance in the program memory 312. According to this example, the brand materials may include a symbol to be used in place of at least one the symbols typically displayed on the reels during normal operation of the gaming unit 75. More particularly, the symbols may be dynamic; that is, the symbols may represent links to web pages stored in a remote location, for example, on the brand server 168. Further, the brand symbols may be used in an outcome for which a prize is associated, the prize being provided by the network operator from an inventory of prizes provided to the network operator by the brand-promoter. Furthermore, the brand materials may include advertising materials that may be downloaded to a personal communication unit 84 associated with the player and in communication with the transceiver 82 of the gaming unit 75.

Because the brand materials are stored locally, the distribution of the materials at block 392 may not be necessary, and the controller 310 may pass to block 394 to use the brand materials.

As for the brand symbols, the controller 310 may perform an initial check to determine that an iteration of the slots routine is not presently being performed. If the slots routine is being performed, the controller 310 may delay the substitution of the brand symbols until the routine has completed the execution of the present iteration of the slots routine. Once the iteration is complete, the controller 310 may substitute the brand symbols for the symbols normally displayed. The controller 310 may also update the paytable to include the brand symbols in those combinations where the replaced symbol was present, and to include the newly instituted prize featuring the brand symbols.

On the other hand, the controller 310 may download the advertising materials to the personal communication unit 84 as soon as the controller is ready to perform block 394. That is, the controller 310 need not delay the downloading of the advertising materials to the personal communication unit 84, which advertisements may take advantage of one or more wireless applications operating on the personal communication unit 84. These advertisements may be displayed on the screen of the personal communication unit 84 at the same time as the brand symbols are used in the presentation of the slots game on the display unit 274 of the gaming unit 75.

Because the brand symbols are dynamic, the player may retrieve further materials from a brand web site by touching one of the brand symbols, or more particularly an area of a touch screen immediately adjacent the section of the display screen 274 where the brand symbol is displayed. In response to this input, the controller 310 may retrieve a link associated with the brand symbol, and using the link, a web page associated with the link. This web page may be a home page for a web site administered by the brand-promoter for the selected brand, such as is shown in FIG. 7. The player may then navigate the brand or brand-promoter website to learn more about the brand and/or the goods and/or services associated with the brand.

Moreover, if the combination of symbols is displayed that results in a prize sponsored by the brand-promoter, the controller 310 may display an image similar to that shown in FIG. 8. The player is thus given three options for his or her prize, from which the player must choose one. When the form is submitted (when the player touches the "enter" button), the controller determines which option has been selected, and sends a signal or message to, for example, the network computer 76. The network computer 76 may, in turn, forward the signal or message through the network 102 to a remote server 110, which server may operate as a prize redemption server. The prize redemption server may have a printer associated therewith, and in response to the signal or message, may print a ticket. An employee of the operator administering the network 72 may receive the ticket, may obtain one of the selected payout from inventory, and may deliver the prize to the player at the gaming unit 75.

The operation of the gaming unit 75 according to the preceding example may continue until the player determines that he or she wishes to discontinue use of the brand association aspect of the system 50, that he or she wishes to discontinue use of the system 50, or the controller 310 determines, at block 444, that the brand will be changed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
   a display device;
   an input device;
   a processor; and
   a memory device which stores a plurality of instructions, which when executed by the processor, cause the processor to operate with the display device and the input device to:
   (a) receive a first wager from a player for a first play of a game;
   (b) display a first image representing the first play of the game;
   (c) display a first outcome associated with the first play of the game;
   (d) determine whether to associate a first payout with the first play of the game, the first payout based on the displayed first outcome and a first paytable;
   (e) display and provide to the player any determined first payout for the first play of the game; and
   (f) when a designated brand-association event for a designated brand occurs in association with the first play of the game:
      (i) receive a second wager from the player for a second play of the game;
      (ii) display a second image representing the second play of the game, said second image including at least one image associated with the designated brand;
      (iii) display a second outcome associated with the second play of the game;
      (iv) determine whether to associate one of a plurality of second payouts included in a second paytable with the second play of the game based on the displayed second outcome and the second paytable, the second paytable having a higher expected average payout than the first paytable, at least one of the second payouts being associated with the designated brand and not being in the first paytable; and
      (v) display and provide to the player any determined second payout for the second play of the game.

2. The gaming system of claim 1, wherein the at least one of the second payouts associated with the designated brand includes at least one of a good and a service associated with the designated brand.

3. The gaming system of claim 1, wherein a payout associated with a winning outcome in the second paytable associated with the designated brand is higher than a payout associated with the same winning outcome in the first paytable.

4. The gaming system of claim 1, wherein when executed by the processor in association with the second play of the game, the plurality of instructions cause the processor to receive an input from the player regarding a link to information regarding the designated brand, retrieve an image associated with the link, the image including information regarding the designated brand, and display the image associated with the link.

5. The gaming system of claim 1, wherein when executed by the processor, the plurality of instructions cause the processor to access a player profile associated with the player, the player profile having data regarding the player associated therewith, and determine, at least in part, the second paytable based on the player profile.

6. A gaming system comprising:
   a display device;
   an input device;
   a processor; and
   a memory device which stores a plurality of instructions, which when executed by the processor, cause the processor to operate with the display device and the input device to:
   (a) receive a first wager from a player for a play of a first game;
   (b) display a first image representing the play of the first game;
   (c) display a first outcome associated with the play of the first game;
   (d) determine whether to associate a first payout with the play of the first game, the first payout based on the displayed first outcome and a first paytable;
   (e) display and provide to the player any determined first payout for the play of the first game; and
   (f) when a designated brand-association event for a designated brand occurs in association with the play of the first game:
      (i) display a second image representing a play of a second game, said second image including at least one image associated with the designated brand;
      (ii) display a second outcome associated with the play of the second game;
      (iii) determine which of a plurality of different second payouts are associated with the play of the second game, the determined second payout based on the displayed second outcome, and at least one of the second payouts being associated with the designated brand and not being in the first paytable; and
      (iv) display and provide to the player the determined second payout for the play of the second game.

7. The gaming system of claim 6, wherein the at least one payout associated with the designated brand includes at least one of a good and a service associated with the designated brand.

8. The gaming system of claim 6, wherein when executed by the processor in association with the second play of the game, the plurality of instructions cause the processor to receive an input from the player regarding a link to information regarding the designated brand, retrieve an image associated with the link, the image including information regarding the designated brand, and display the image associated with the link.

9. The gaming system of claim 6, wherein when executed by the processor, the plurality of instructions cause the processor to access a player profile associated with the player, the player profile having data regarding the player associated therewith, and determine, at least in part, at least one of the second payouts associated with the designated brand based on the player profile.

10. A method of operating a gaming system, the method comprising:
(a) causing a processor to operate with at least one input device to receive a first wager from a player for a first play of a game;
(b) causing the processor to operate with at least one display device to display a first image representing the first play of the game;
(c) causing the processor to operate with the at least one display device to display a first outcome associated with the first play of the game;
(d) causing the processor to determine whether to associate a first payout with the first play of the game, the first payout based on the displayed first outcome and a first paytable;
(e) causing the processor to operate with the at least one display device to display and provide to the player any determined first payout for the first play of the game; and
(f) when a designated brand-association event for a designated brand occurs in association with the first play of the game:
(i) causing the processor to operate with the at least one input device to receive a second wager from the player for a second play of the game;
(ii) causing the processor to operate with the at least one display device to display a second image representing the second play of the game, said second image including at least one image associated with the designated brand;
(iii) causing the processor to operate with the at least one display device to display a second outcome associated with the second play of the game;
(iv) causing the processor to determine whether to associate one of a plurality of second payouts included in a second paytable with the second play of the game based on the displayed second outcome and the second paytable, the second paytable having a higher expected average payout than the first paytable, at least one of the second payouts being associated with the designated brand and not being in the first paytable; and
(v) causing the processor to operate with the at least one display device to display and provide to the player any determined second payout for the second play of the game.

11. The method of claim 10, wherein the at least one of the second payouts associated with the designated brand includes at least one of a good and a service associated with the designated brand.

12. The method of claim 10, wherein a payout associated with a winning outcome in the second paytable associated with the designated brand is higher than a payout associated with the same winning outcome in the first paytable.

13. The method of claim 10, which includes, in association with the second play of the game, causing the processor to operate with the at least one input device to receive an input from the player regarding a link to information regarding the designated brand, causing the processor to retrieve an image associated with the link, the image including information regarding the designated brand, and causing the processor to operate with the at least one display device to display the image associated with the link.

14. The method of claim 10, which includes causing the processor to access a player profile associated with the player, the player profile having data regarding the player associated therewith, and causing the processor to determine, at least in part, the second paytable based on the player profile.

15. A method of operating a gaming system, the method comprising:
(a) causing a processor to operate with at least one input device to receive a first wager from a player for a play of a first game;
(b) causing the processor to operate with at least one display device to display a first image representing the play of the first game;
(c) causing the processor to operate with the at least one display device to display a first outcome associated with the play of the first game;
(d) causing the processor to determine whether to associate a first payout with the play of the first game, the first payout based on the displayed first outcome and a first paytable;
(e) causing the processor to operate with the display device to display and provide to the player any determined first payout for the play of the first game; and
(f) when a designated brand-association event for a designated brand occurs in association with the play of the first game:
(i) causing the processor to operate with the at least one display device to display a second image representing a play of a second game, said second image including at least one image associated with the designated brand;
(ii) causing the processor to operate with the at least one display device to display a second outcome associated with the play of the second game;
(iii) causing the processor to determine which of a plurality of different second payouts are associated with the play of the second game, the determined second payout based on the displayed second outcome, and at least one of the second payouts being associated with the designated brand and not being in the first paytable; and
(iv) causing the processor to operate with the at least one display device to display and provide to the player the determined second payout for the play of the second game.

16. The method of claim 15, wherein the at least one payout associated with the designated brand includes at least one of a good and a service associated with the designated brand.

17. The method of claim 15, which includes, in association with the play of the second game, causing the processor to operate with the at least one input device to receive an input from the player regarding a link to information regarding the designated brand, causing the processor to retrieve an image associated with the link, the image including information regarding the designated brand, and causing the processor to operate with the at least one display device to display the image associated with the link.

18. The method of claim 15, which includes causing the processor to access a player profile associated with the player, the player profile having data regarding the player associated therewith, and causing the processor to determine, at least in part, at least one of the second payouts associated with the designated brand based on the player profile.

* * * * *